United States Patent
Osaki et al.

(10) Patent No.: US 12,467,516 B2
(45) Date of Patent: Nov. 11, 2025

(54) TOOTHED BELT

(71) Applicant: Mitsuboshi Belting Ltd., Kobe (JP)

(72) Inventors: Susumu Osaki, Hyogo (JP); Yusuke Hemmi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 18/273,499

(22) PCT Filed: Jan. 21, 2022

(86) PCT No.: PCT/JP2022/002298
§ 371 (c)(1),
(2) Date: Jul. 20, 2023

(87) PCT Pub. No.: WO2022/158582
PCT Pub. Date: Jul. 28, 2022

(65) Prior Publication Data
US 2024/0077131 A1  Mar. 7, 2024

(30) Foreign Application Priority Data

Jan. 25, 2021 (JP) .................... 2021-009529
Jan. 14, 2022 (JP) .................... 2022-004259

(51) Int. Cl.
*F16G 1/28* (2006.01)
*F16G 1/10* (2006.01)

(52) U.S. Cl.
CPC ............... *F16G 1/28* (2013.01); *F16G 1/10* (2013.01)

(58) Field of Classification Search
CPC .............. F16G 1/10; F16G 1/28; F16G 1/04
See application file for complete search history.

(56) References Cited

U.S. PATENT DOCUMENTS 3,894,900 A * 7/1975 Redmond, Jr. ........... F16G 1/28
428/179
3,964,328 A * 6/1976 Redmond, Jr. ........ B29D 29/08
474/205

(Continued)

FOREIGN PATENT DOCUMENTS

CN      110546400 A    12/2019
EP       4379235 A1 *  6/2024  ............ B29D 29/08

(Continued)

OTHER PUBLICATIONS

"TORAYCA Carbon Fiber", 2024, Toray Composite Materials America, Inc. (https://www.toraycma.com/products/carbon-fiber/#pattern3_1). (Year: 2024).*

(Continued)

*Primary Examiner* — Anna M Momper
*Assistant Examiner* — Katelynne R Burrell
(74) *Attorney, Agent, or Firm* — Banner & Witcoff, Ltd.

(57) ABSTRACT

A toothed belt including a reinforcing layer with 0.05 mm to 0.2 mm thickness buried along a contour of tooth portions such that a maximum height from a bottom portion of the tooth portion to the reinforcing layer is in a range of 30% to 100% of a height from the bottom portion to a tooth tip, in which the reinforcing layer includes reinforcing fiber filaments arranged in a belt circumferential direction, in the reinforcing layer, a weight per unit area of fibers intersecting the belt circumferential direction is 30% or less of a weight per unit area of the reinforcing fiber filaments, the reinforcing layer has a structure where the reinforcing fiber filaments are arranged in the belt circumferential direction and bonded to form a sheet shape in an untwisted state, and a tensile modulus of the reinforcing fiber filament satisfies a specific condition.

5 Claims, 16 Drawing Sheets

(56) References Cited

U.S. PATENT DOCUMENTS

| | | | | |
|---|---|---|---|---|
| 4,099,422 | A | * | 7/1978 | Cicognani ................. B32B 5/26 |
| | | | | 474/264 |
| 4,583,963 | A | * | 4/1986 | Marsh ....................... F16G 1/28 |
| | | | | 474/205 |
| 4,627,828 | A | * | 12/1986 | Nagai ........................ F16G 1/28 |
| | | | | 474/205 |
| 4,632,665 | A | * | 12/1986 | Skura ..................... B29D 29/08 |
| | | | | 474/205 |
| 5,536,214 | A | * | 7/1996 | Akita ........................ F16G 1/28 |
| | | | | 474/268 |
| 5,741,197 | A | * | 4/1998 | Akita ..................... B29D 29/08 |
| | | | | 474/268 |
| 10,018,248 | B2 | | 7/2018 | Duke, Jr. et al. |
| 10,408,300 | B2 | * | 9/2019 | Sekiguchi ............... C08L 75/08 |
| 10,844,931 | B2 | * | 11/2020 | McNamee ............. B29D 29/08 |
| 10,989,274 | B2 | * | 4/2021 | Ochoa ....................... F16G 1/10 |
| 11,644,082 | B2 | * | 5/2023 | Tsubakino ................ F16G 1/26 |
| | | | | 474/237 |
| 2017/0191545 | A1 | * | 7/2017 | Sekiguchi ............... C08G 18/10 |
| 2018/0313431 | A1 | * | 11/2018 | McNamee ................ F16G 1/28 |
| 2021/0102601 | A1 | | 4/2021 | Hamamoto et al. |

FOREIGN PATENT DOCUMENTS

| | | | |
|---|---|---|---|
| JP | H03-265739 A | 11/1991 | |
| JP | 2002147537 A | 5/2002 | |
| JP | 2006-153038 A | 6/2006 | |
| JP | 2007092993 A | 4/2007 | |
| JP | 2010-196889 A | 9/2010 | |
| JP | 2018-119680 A | 8/2018 | |
| JP | 2020-038008 A | 3/2020 | |
| JP | 2020-517877 A | 6/2020 | |
| WO | WO-2012156223 A1 * | 11/2012 | ............... F16G 1/10 |
| WO | 2016-047052 A1 | 3/2016 | |

OTHER PUBLICATIONS

Toray Composite Materials America, Inc., "Torayca Technical Manual", Torayca, p. 5. https://www.toraycma.com/wp-content/uploads/Torayca-Technical-Manual_4-28-2020.pdf (Year: 2020).*

Hanesaka, JP_2006153038_A_I_Translation, 2004, Clarivate Analytics (Year: 2004).*

Jul. 27, 2023—(TW) Office Action—TW App. 111103105, Eng Tran.

Mar. 8, 2022—International Search Report—Intl App PCT/JP2022/002298.

Oct. 13, 2022—(TW) Office Action—App 111103105.

Feb. 12, 2023—(TW) Office Action—App 111103105.

Oct. 25, 2024—(EP) Extended EP Search Report—EP App 22742701.0.

Oct. 24, 2024—(CA) Office Action—App 3,205,094.

Sep. 10, 2025—(CN) Office Action—CN App 202280011239.1, Eng Tran.

* cited by examiner

BEFORE DISPLACEMENT

AFTER DISPLACEMENT

FIG. 12

VERIFICATION OF POSITION OF REINFORCING LAYER RELATIVE TO TOOTH HEIGHT

| | COMPARATIVE EXAMPLE 1 | COMPARATIVE EXAMPLE 2 | EXAMPLE 1 | EXAMPLE 2 | EXAMPLE 3 |
|---|---|---|---|---|---|
| FEM MODEL | 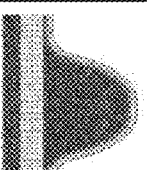 | 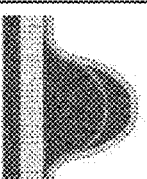 | 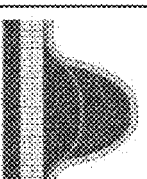 | 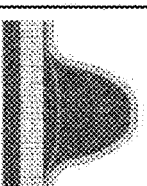 | 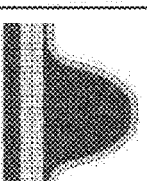 |
| TOOTH HEIGHT H1 (mm) | 3.5 | 3.5 | 3.5 | 3.5 | 3.5 |
| POSITION H2 OF REINFORCING LAYER (mm) | 0 | 0.2 | 1.2 | 2.2 | 3.2 |
| RATIO OF POSITION H2 OF REINFORCING LAYER TO TOOTH HEIGHT H1 H2/H1 × 100 | 0% | 6% | 34% | 63% | 91% |
| UNIDIRECTIONAL FIBER ELASTIC MODULUS GPa | 0 | 115 | 115 | 115 | 115 |
| TOOTH RIGIDITY MAXIMUM VALUE X N/mm | 61 | 86 | 133 | 140 | 137 |
| EVALUATION | C | B | A | A | A |
| Mises STRESS DISTRIBUTION DIAGRAM | 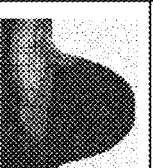 | 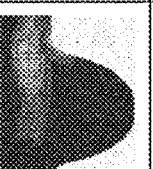 | 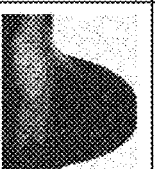 | 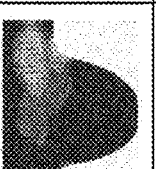 | 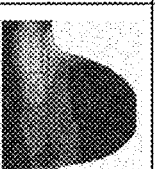 |
| MAXIMUM VALUE Y MPa | 26.2 | 24.0 | 12.5 | 11.0 | 10.9 |
| EVALUATION | C | C | A | A | A |
| COMPREHENSIVE EVALUATION | RANK C | RANK C | RANK A | RANK A | RANK A |

FIG. 14

VERIFICATION OF ELASTIC MODULUS OF UNIDIRECTIONAL FIBER

| | REFERENCE EXAMPLE 1 | REFERENCE EXAMPLE 2 | EXAMPLE 4 | EXAMPLE 1 | EXAMPLE 5 |
|---|---|---|---|---|---|
| RATIO OF POSITION H2 OF REINFORCING LAYER TO TOOTH HEIGHT H1 H2/H1 × 100 | 34% | 34% | 34% | 34% | 34% |
| UNIDIRECTIONAL FIBER ELASTIC MODULUS GPa | 0.5 | 5 | 50 | 115 | 230 |
| TOOTH RIGIDITY MAXIMUM VALUE X N/mm | 64 | 79 | 118 | 133 | 140 |
| TOOTH RIGIDITY EVALUATION | B | B | A | A | A |
| Mises STRESS DISTRIBUTION DIAGRAM | 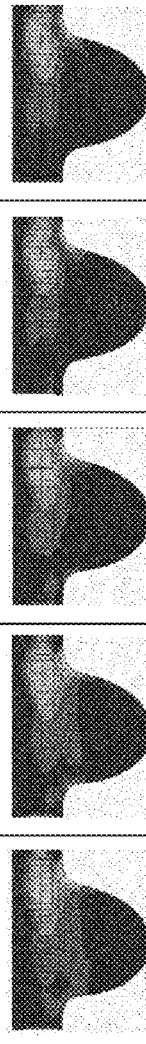 | 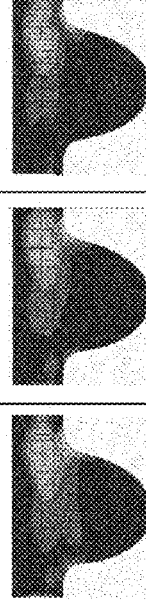 | 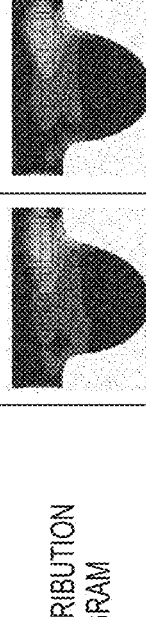 | 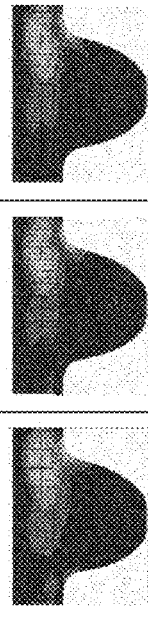 | 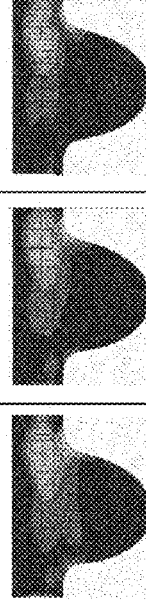 |
| Mises STRESS MAXIMUM VALUE Y MPa | 25.1 | 20.7 | 13.7 | 12.5 | 12.5 |
| Mises STRESS EVALUATION | C | B | A | A | A |
| COMPREHENSIVE EVALUATION | RANK C | RANK B | RANK A | RANK A | RANK A |

TOOTHED BELT

CROSS REFERENCE TO RELATED APPLICATIONS

This is a U.S. National Phase Application under 35 U.S.C. § 371 of International Application No. PCT/JP2022/002298, filed Jan. 21, 2022, which claims priority to Japanese Application Nos. 2021-009529, filed Jan. 25, 2021, and 2022-004259, filed Jan. 14, 2022, which were published Under PCT Article 21 (2), the entire contents of which are incorporated herein by reference.

TECHNICAL FIELD

The present invention relates to a toothed belt used for synchronous transmission of a device that transmits a high load by a belt.

BACKGROUND ART

A power transmission belt that transmits power is roughly classified into a frictional power transmission belt and a meshing power transmission belt. Examples of the frictional power transmission belt include a flat belt, a V belt, and a V-ribbed belt, and examples of a meshing power transmission belt include a toothed belt and the like. The toothed belt includes a back portion in which a core wire is buried substantially parallel to a belt circumferential direction, tooth portions arranged at predetermined intervals in the belt circumferential direction, and a tooth fabric for covering a surface of the tooth portions. The tooth portions of the toothed belt transmit power by being fitted to a pulley having grooves facing the tooth portions. The toothed belt does not slip between the toothed belt and the pulley, and can reliably transmit a high load. In recent years, there has been an increasing number of examples used for industrial machinery, internal combustion engines of automobiles, and rear-wheel drive of motorcycles, and in particular, with the miniaturization of machines, the toothed belt is also required to be miniaturized (to cope with a small-diameter pulley, and to have a smaller width). As a result, a toothed belt having high durability that can withstand use under a condition in which a higher load acts is required even for the miniaturized toothed belt.

One of failure forms of the toothed belt is tooth chipping in which the tooth portions are lost from a belt body. It is considered that the tooth chipping occurs due to repeated deformation of the tooth portion in a process in which stress is intensively applied to a root of the tooth portion. As a cause of the occurrence of the tooth chipping, a mechanism is considered in which a minute crack first occurs in a tooth root and then the crack grows. In particular, in the case where the toothed belt is used under a condition in which a high load acts, stress concentrated on a tooth root portion becomes particularly large, and a crack is easily generated from the tooth root as a starting point to lead to tooth chipping.

Therefore, it is necessary to prevent deformation of the tooth portion and to particularly reinforce the tooth root portion on which stress (tooth load) is concentrated under the action of the load. That is, it is a major problem to ensure rigidity (deformation resistance) of the tooth portion as well as tooth root crack resistance (tooth chipping resistance).

CITATION LIST

Patent Literature

Patent Literature 1: JPH03-265739A
Patent Literature 2: WO2016/047052
Patent Literature 3: JP2020-517877A
Patent Literature 4: JP2010-196889A
Patent Literature 5: JP2018-119680A

SUMMARY OF INVENTION

Technical Problem

In this regard, as a method of reinforcing a tooth portion of a toothed belt, many prior arts have been disclosed and various means have been proposed from the past. For example, Patent Literatures 1 to 3 disclose a method of reinforcement with short fibers or a fabric layer oriented in a predetermined portion, in particular, a method of arranging a "reinforcing layer in which a fabric layer is arranged along a shape (approximate contour) of teeth". These are basically intended to solve the problem of "reinforcement of tooth roots and prevention of tooth chipping" for reinforcement of the toothed belt.

In Patent Literature 4, although there is no problem of "reinforcement of tooth roots and prevention of tooth chipping" as Patent Literature 4 is an invention related to the cogged V-belt different from the toothed belt, a cogged V-belt in which a reinforcing layer made of a fiber-reinforced resin is buried in a compression rubber layer along a cog shape for reinforcement of the V-belt is disclosed. The reinforcing layer contains carbon fibers oriented in a belt width direction. Although the appearance of the cogged V-belt of Patent Literature 4 has some similar portion to the toothed belt, the toothed belt is classified as a meshing power transmission belt in which a tooth portion is fitted into a pulley groove and power is transmitted by meshing transmission, whereas the cogged V-belt is classified as a frictional power transmission belt in which a lower surface (inner peripheral surface) of the belt does not come into contact with a pulley and a side surface of the belt is in contact with the pulley to perform friction transmission, and both are different types of power transmission belts having completely different power transmission mechanisms.

In Patent Literature 5, although there is no problem of "reinforcement of tooth roots and prevention of tooth chipping" as Patent Literature 5 is an invention related to the V belt different from the toothed belt, a V belt in which a sheet (unidirectional fiber sheet) in which fiber filaments are oriented in one direction is buried as a reinforcing layer for reinforcement of the V belt is disclosed.

The reinforcing layer of the V belt is intended to reinforce the belt in a width direction in order to increase resistance to lateral pressure received from a pulley on both sides of the V-shape, and therefore the fiber filaments of the unidirectional fiber sheet are oriented in the width direction. On the other hand, in the case of the toothed belt, the toothed belt does not come into contact with the pulley in the belt width direction, and the tooth portion is in contact with the pulley in the belt circumferential direction. Therefore, reinforcement of the toothed belt in the belt width direction is needed. Therefore, in the toothed belt, the fiber filaments are oriented in the circumferential direction, but when the fiber filaments are oriented in the circumferential direction, bendability (ease of bending) of the toothed belt is deteriorated, and winding properties to the pulley (meshing properties to the pulley) are deteriorated.

Therefore, the reinforcing layer of the toothed belt needs to have its original design concept in consideration of compatibility with the bendability (ease of bending) of the toothed belt (which is contrary to the reinforcement).

Thus, an object of the present invention is to provide a toothed belt that ensures sufficient tooth root crack (tooth chipping) resistance while ensuring bendability.

Solution to Problem

In order to solve the above problem, the present invention provides a toothed belt including:
- tooth portions arranged at predetermined intervals in a belt circumferential direction; and
- a reinforcing layer buried along a contour of the tooth portions,
in which,
- the reinforcing layer is buried in the tooth portion such that a maximum height from a bottom portion of the tooth portion to the reinforcing layer is in a range of 30% to 100% of a height from the bottom portion of the tooth portion to a tooth tip of the tooth portion,
- the reinforcing layer includes a plurality of reinforcing fiber filaments arranged in the belt circumferential direction,
- in the reinforcing layer, a weight per unit area of fibers intersecting the belt circumferential direction is 30% or less of a weight per unit area of the reinforcing fiber filaments,
- the reinforcing layer has a structure in which the reinforcing fiber filaments are arranged in the belt circumferential direction and bonded to form a sheet shape in an untwisted state,
- the reinforcing layer has a thickness of 0.05 mm to 0.2 mm, and
- a tensile modulus (GPa) of the reinforcing fiber filament satisfies a condition of:
- 5≤[thickness (mm) of the reinforcing layer]×[tensile modulus (GPa) of the reinforcing fiber filament]≤60.

According to the configuration, the plurality of reinforcing fiber filaments are buried in the toothed belt as a reinforcing layer in a sheet shape while being arranged in the belt circumferential direction. Furthermore, since the plurality of reinforcing fiber filaments constituting the reinforcing layer are bonded to form a sheet shape, it is possible to prevent orientation of the reinforcing fiber filaments from being disturbed.

The reinforcing layer contains the fibers intersecting the belt circumferential direction only in an amount of 30% or less of the weight per unit area of the reinforcing fiber filaments. Therefore, it is possible to ensure substantially the same bendability as in the case where the reinforcing layer is not provided. That is, a decrease in bendability of the toothed belt can be prevented. The thickness of the reinforcing layer can be reduced by burying the reinforcing fiber filaments in an untwisted state. Accordingly, it is possible to further prevent a decrease in bendability. In the present invention, the term "untwisted" means that the twist number is 1 time/10 cm or less. Since the reinforcing fiber filaments are buried in the untwisted state, it is difficult to generate heat due to friction between fibers during bending. By preventing the decrease in bendability, it is possible to prevent heat generation of the toothed belt due to bending when the toothed belt is wound around or separated from the pulley. Therefore, it is possible to prevent the temperature rise of the toothed belt during running. By preventing the temperature rise of the toothed belt, the toothed belt can have a longer service life.

The reinforcing layer has a thickness of 0.05 mm to 0.2 mm. When the thickness of the reinforcing layer exceeds 0.2 mm, bending fatigue resistance may deteriorate due to an increase in bending rigidity (decrease in bendability). In the present invention, by setting the thickness of the reinforcing layer to 0.2 mm or less, it is possible to reliably prevent decrease of bending fatigue resistance due to a decrease in bendability. On the other hand, when the thickness of the reinforcing layer is less than 0.05 mm, sufficient tooth root crack (tooth chipping) resistance may not be ensured. In the present invention, since the untwisted reinforcing fiber filaments have a high effect of improving the tooth root crack (tooth chipping) resistance, even when the reinforcing layer is as thin as 0.05 mm to 0.2 mm, sufficient tooth root crack (tooth chipping) resistance can be ensured while preventing a decrease in bending fatigue resistance. In the present invention, the "thickness of the reinforcing layer" refers to a thickness of each reinforcing layer even when there are a plurality of reinforcing layers.

The tensile modulus (GPa) of the reinforcing fiber filament included in the reinforcing layer satisfies a condition that a value (index Z) of "[thickness (mm) of the reinforcing layer]×[tensile modulus (GPa) of the reinforcing fiber filament]", which is an index value representing the rigidity of the reinforcing layer, is 5 or more and 60 or less, and thus sufficient tooth root crack resistance can be ensured while preventing a decrease in bending fatigue resistance in a range of the thickness of the reinforcing layer of 0.05 mm to 0.2 mm.

Since the reinforcing fiber filaments are bonded to form a sheet shape and are not separated from each other, the reinforcing layer can be easily handled at the time of manufacturing the toothed belt. Specifically, it is possible to easily carry out an operation of winding the sheet serving as the reinforcing layer on unvulcanized rubber and an operation of applying an adhesion treatment such as an RFL treatment or a rubber cement treatment to the reinforcing layer.

In the toothed belt of the present invention, the reinforcing fiber filament may have a tensile modulus of 50 GPa to 300 GPa.

When the tensile modulus of the reinforcing fiber filament is less than 50 GPa, sufficient tooth root crack (tooth chipping) resistance may not be ensured. In the present invention, by setting the tensile modulus of the reinforcing fiber filament to 50 GPa or more, even when the thickness of the reinforcing layer is reduced, it is possible to ensure sufficient tooth root crack (tooth chipping) resistance while preventing a decrease in bending fatigue resistance.

When the tensile modulus of the reinforcing fiber filament is 300 GPa or less, the effect of preventing the above described failure can be secured, and the toothed belt can have a longer service life.

In the toothed belt of the present invention, the reinforcing fiber filament may have a diameter of 0.1 μm to 50 μm.

According to the above configuration, bendability of the toothed belt can be ensured while handleability in a manufacturing process can be ensured.

In the toothed belt of the present invention, the reinforcing layer may include no fibers intersecting the belt circumferential direction.

That is, in the case where a weight per unit area of the fibers intersecting the belt circumferential direction is 0% of the weight per unit area of the reinforcing fiber filaments in the reinforcing layer, it is possible to ensure the same bendability as in the case where the reinforcing layer is not provided in the toothed belt.

Advantageous Effects of Invention

It is possible to provide a toothed belt that ensures sufficient tooth root crack (tooth chipping) resistance while ensuring bendability.

BRIEF DESCRIPTION OF DRAWINGS

FIG. 12 is a table summarizing comprehensive evaluation results and the like according to Examples 1 to 3 and Comparative Examples 1 to 2.

FIG. 14 is a table summarizing comprehensive evaluation results and the like according to Example 1, Examples 4 to 5, and Reference Examples 1 to 2.

DESCRIPTION OF EMBODIMENTS

Next, a toothed belt 1 according to an embodiment of the present invention will be described with reference to the drawings.

[Toothed Belt 1]

Figure 1:
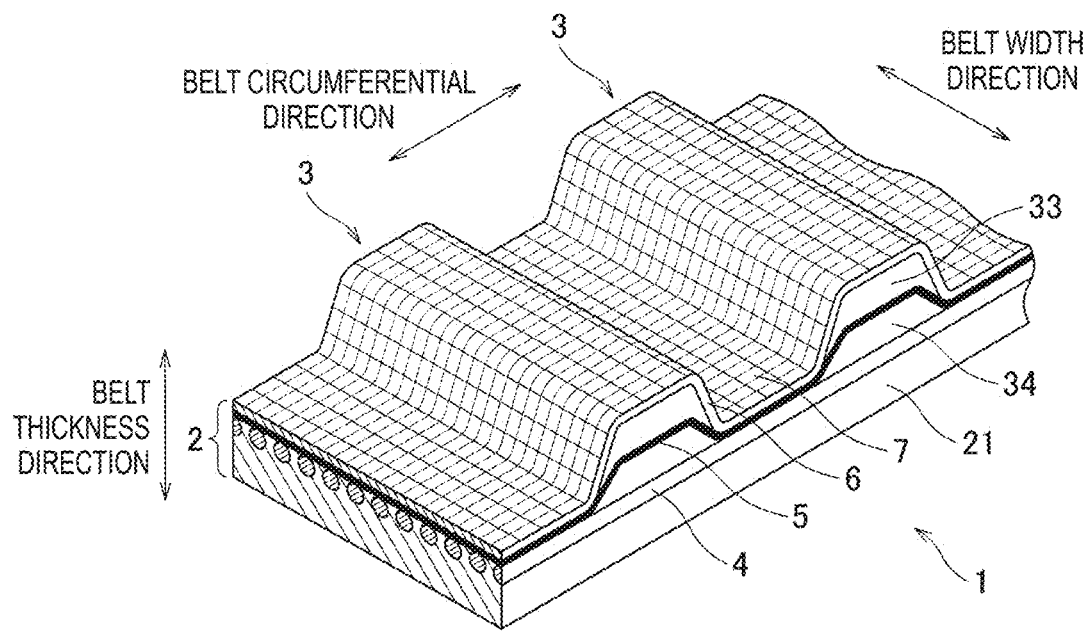
FIG. 1 is a cross-sectional perspective view of a toothed belt according to an embodiment.
Figure 2:
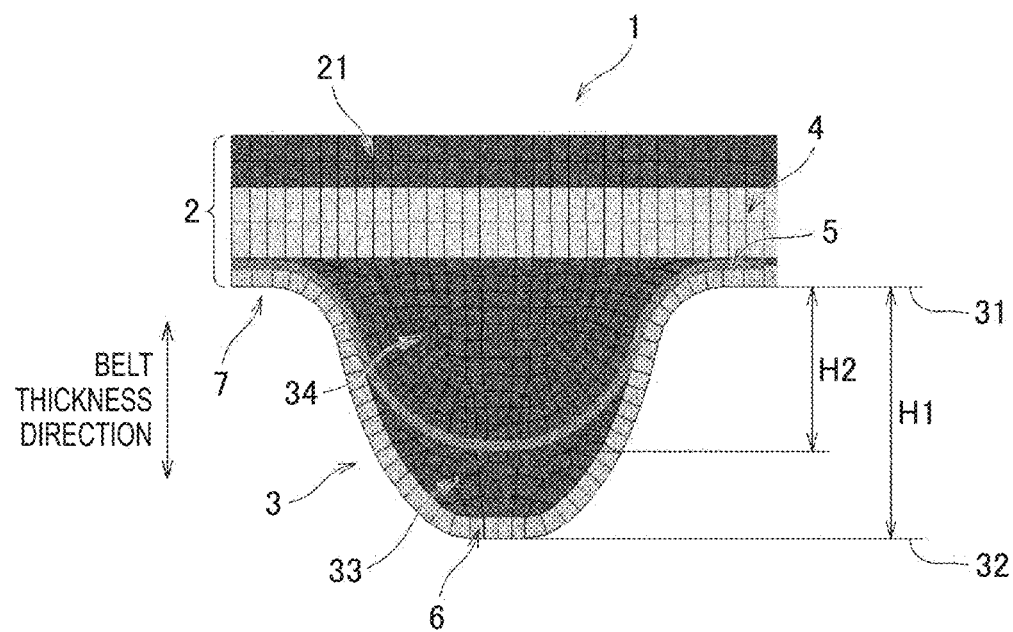
FIG. 2 is a cross-sectional view of the toothed belt according to the embodiment in a belt circumferential direction.
Figure 3:
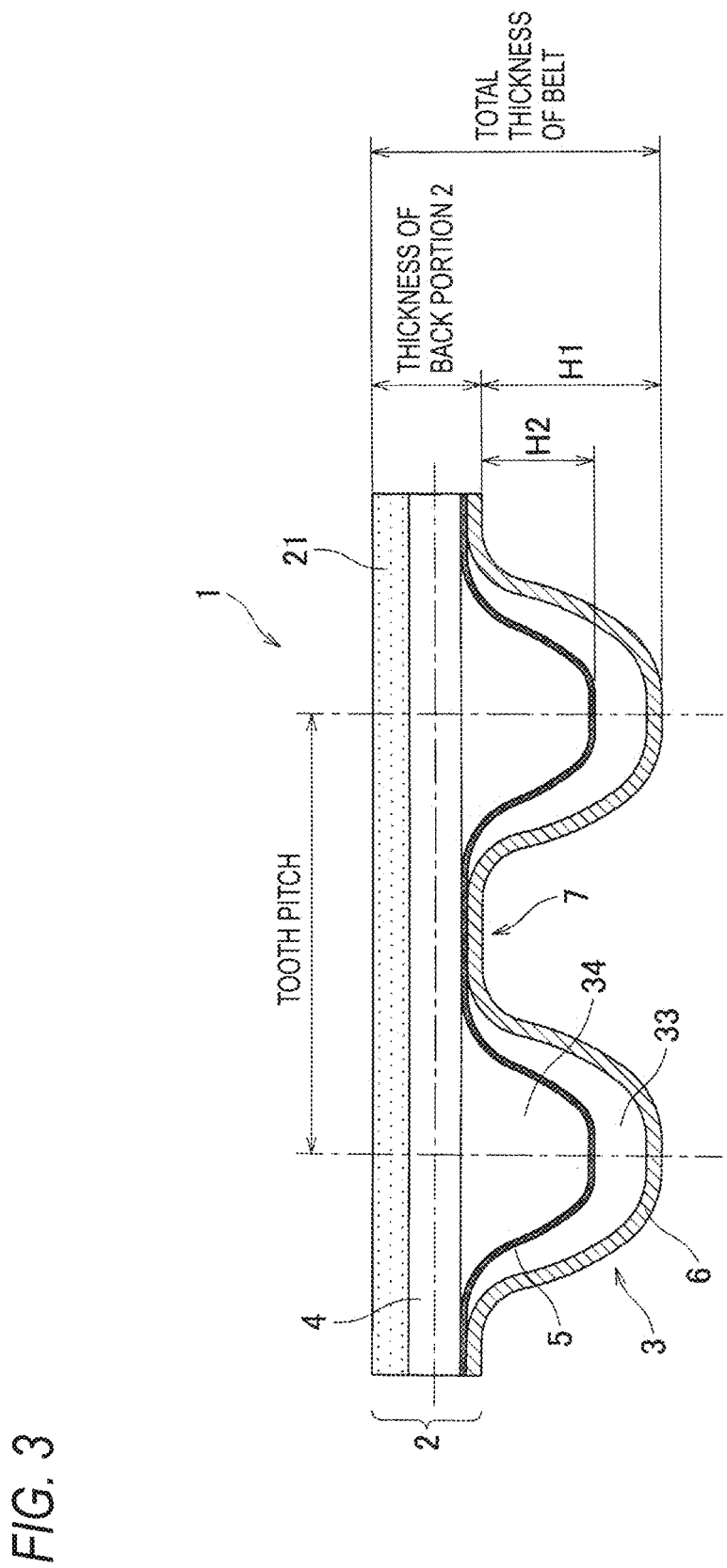
FIG. 3 is an explanatory view of the belt circumferential direction of the toothed belt according to the embodiment.

The toothed belt 1 of the present embodiment is an endless meshing power transmission belt, and includes a back portion 2 in which core wires 4 are buried so as to extend in a belt circumferential direction (belt longitudinal direction), and a plurality of tooth portions 3 arranged at predetermined intervals along an inner circumferential surface of the back portion 2, as shown in FIG. 1 to FIG. 3.

Further, each of the tooth portions 3 of the toothed belt 1 of the present embodiment has a tooth rubber layer constituted with a first rubber layer (surface rubber layer) 33 and a second rubber layer (inner rubber layer) 34 on an inner circumferential belt surface side of the core wires 4. In the tooth rubber layer, a reinforcing layer 5 buried in the belt circumferential direction along a contour of the tooth portion 3 is provided between the first rubber layer 33 and the second rubber layer 34. That is, the first rubber layer 33 is disposed on the inner circumferential belt surface side of the reinforcing layer 5 along the contour of the tooth portion 3, and the second rubber layer 34 is disposed between the reinforcing layer 5 and the core wires 4 (in contact with the reinforcing layer 5 and the core wire 4). In the specification, the first rubber layer 33 and the second rubber layer 34 are collectively referred to as the tooth rubber layer.

A flat tooth bottom portion 7 is present between adjacent ones of the tooth portions 3, and the tooth portion 3 and the tooth bottom portion 7 are alternately formed along the circumferential direction (belt longitudinal direction) on an inner circumferential belt surface. In the aspect shown in FIG. 1 to FIG. 3, one continuous tooth fabric 6 is disposed on a surface of the tooth portion 3 and an inner circumferential surface (that is, a surface of the tooth bottom portion 7) of the back portion 2. The tooth fabric 6 may be used as necessary from the viewpoint of wear resistance and tooth chipping resistance of the tooth portion 3.

In the specification, the tooth fabric 6 constituting the surface of the tooth portion 3 is a component of the tooth portion 3, while the tooth fabric 6 constituting the surface of the tooth bottom portion 7 is a component of the back portion 2. Each tooth fabric 6 constituting the tooth portion 3 is a part of the continuous tooth fabric 6 (part of the tooth fabric 6 in FIG. 1). Also in the tooth bottom portion 7, a first rubber layer as a surface rubber layer, a reinforcing layer, and a second rubber layer as an inner rubber layer (not shown) are interposed between the tooth fabric 6 and the core wires 4. The thickness of the first rubber layer and the second rubber layer in the tooth bottom portion 7 is extremely thin compared to the thickness of the first rubber layer 33 and the second rubber layer 34 in the tooth portion 3.

The back portion 2 has a back rubber layer 21 disposed on an outer circumferential belt surface side of the core wires 4, and the back rubber layer 21 forms the outer circumferential belt surface.

The core wires 4 extend in the belt circumferential direction (belt longitudinal direction) and are arranged at intervals in the belt width direction. A gap between adjacent ones of the core wires 4 may be made of a rubber composition constituting the back rubber layer 21 and/or the second rubber layer (in particular, a rubber composition constituting the back rubber layer 21).

The toothed belt 1 is used for high-load transmission applications such as industrial machinery, internal combustion engines of automobiles, and rear-wheel drive of motorcycles. For example, in a state in which the toothed belt 1 is wound between a drive pulley (toothed pulley) and a driven pulley (toothed pulley), power is transmitted from the drive pulley side to the driven pulley side by rotation of the drive pulley.

The toothed belt 1 is not limited to the form or structure shown in FIG. 1 to FIG. 3. For example, as long as the plurality of tooth portions 3 can mesh with the toothed pulley, a cross-sectional shape of each of the tooth portions 3 (cross-sectional shape of the toothed belt 1 in the belt circumferential direction) is not limited to a substantially trapezoidal shape, and may be, for example, a semicircular shape, a semielliptical shape, or a polygonal shape (triangular shape, quadrilateral (such as rectangular) shape, or the like). Among them, a substantially trapezoidal shape is preferable from the viewpoint of meshing power transmission properties and the like.

An interval (tooth pitch) between the adjacent ones of the tooth portions 3 in the circumferential direction may be, for example, 2 mm to 25 mm. A numerical value of the tooth pitch also corresponds to a size of a scale (length of the tooth portion 3 in the belt circumferential direction and a tooth height H1 of the tooth portion 3) of the tooth portion 3. That is, as the tooth pitch becomes larger, the scale of the tooth portion 3 becomes larger similarly. In an application where a particularly high load acts, the tooth portion 3 having a large scale is required, and the tooth pitch may be 5 mm or more, preferably 8 mm or more, and more preferably 14 mm or more.

Furthermore, an average tooth height of the tooth portions 3 may be 40% to 70%, and preferably 50% to 65%, with respect to an average thickness of the entire belt. As shown in FIG. 3, the average tooth height of the tooth portions 3 means an average height of the tooth portions 3 protruding from the inner circumferential belt surface (average height of the tooth portions 3 protruding from the tooth bottom portion 7).

[Tooth Portion 3]

The tooth portion 3 has a surface made of the tooth fabric 6, and includes the first rubber layer 33 disposed along the contour of the tooth portion 3 on a side in contact with the tooth fabric 6, the reinforcing layer 5 disposed along the contour of the tooth portion 3 on the outer circumferential belt surface side of the first rubber layer 33, and the second rubber layer 34 disposed along the contour of the tooth portion 3 on the outer circumferential belt surface side of the reinforcing layer 5. The first rubber layer 33 and the second rubber layer 34 may be made of different rubber compositions or may be made of the same rubber composition.

The tooth portion 3 (first rubber layer 33 and second rubber layer 34) is preferably made of a rubber composition having the JIS-D hardness (value measured using a type D durometer) of 60 degrees or more and 66 degrees or less. The JIS-D hardness is the hardness in accordance with JIS K 6253 (2012), and is the hardness of a side surface of the tooth portion 3 of the toothed belt 1 measured using a type D durometer.

Generally, the JIS-A hardness (value measured using a type A durometer) is often used as the rubber hardness of a rubber composition, but when the value measured using the type A durometer exceeds 90 degrees, it is preferable to use a type D durometer. In the toothed belt 1 of the present embodiment, the hardness of the tooth portion 3 is higher than the hardness of the back portion 2 to be described later, and exceeds 90 degrees in the JIS-A hardness. Therefore, the hardness of the tooth portion 3 is evaluated by the JIS-D hardness.

(Tooth Rubber Layer: Crosslinked Rubber Composition)

(A) Rubber Component

Examples of rubber components of the rubber composition (crosslinked rubber composition) constituting the tooth portion 3 (tooth rubber layer) include a diene rubber [a natural rubber, an isoprene rubber, a butadiene rubber, a chloroprene rubber, a butyl rubber, a styrene-butadiene rubber (SBR), a vinylpyridine-styrene-butadiene rubber, an acrylonitrile-butadiene rubber (nitrile rubber; NBR), an acrylonitrile-chloroprene rubber, a hydrogenated nitrile rubber (HNBR), and the like], an ethylene-α-olefin elastomer [an ethylene-propylene copolymer (EPM), an ethylene-propylene-diene terpolymer (EPDM), and the like], a chlorosulfonated polyethylene rubber (CSM), an alkylated chlorosulfonated polyethylene rubber (ACSM), an epichlorohydrin rubber, an acrylic rubber, a silicone rubber, a urethane rubber, a fluorine rubber, and the like. The rubber components may be carboxylated, such as a carboxylated SBR or a carboxylated NBR. Those rubber components may be used alone or in combination of two or more kinds thereof.

A particularly preferred rubber component is the hydrogenated nitrile rubber (HNBR), and the chloroprene rubber and the ethylene-propylene-diene terpolymer (EPDM) are also preferably used. Particularly preferred rubber components in the application where a particularly high load acts are rubbers having high heat aging resistance, particularly the hydrogenated nitrile rubber. In the rubber component, a proportion of the preferred rubber component is preferably 50 mass % or more (for example, about 80 mass % to 100 mass %), particularly preferably 100 mass %. A hydrogenation rate of the hydrogenated nitrile rubber can be selected from a range of about 50% to 100%, and may be 70% to 100%.

The HNBR refers to a rubber in which while oil resistance, which is an advantage of a conventional nitrile rubber, is maintained, an unsaturated bond (carbon-carbon double bond) of the conventional nitrile rubber is chemically hydrogenated in order to prevent aging of rubber elasticity due to a recombination reaction of sulfur during heat aging, thereby making the recombination reaction during the heat aging less likely to occur and improving heat resistance.

The iodine value (unit: mg/100 mg) of the HNBR is, for example, 5 to 60 (for example, 7 to 50), preferably 8 to 40 (for example, 8 to 35), and more preferably 10 to 30. The iodine value is an index indicating the amount of unsaturated bonds, and indicates that the higher the iodine value, the greater the amount of unsaturated bonds contained in a polymer molecular chain. The iodine value is determined by adding excessive amount of iodine to a measurement sample to cause a complete reaction (reaction between the iodine and the unsaturated bonds), and quantifying the amount of remaining iodine by redox titration. When the iodine value of the HNBR is small, a crosslinking reaction between the HNBR is not sufficient, and the rigidity of the crosslinked rubber is low, and thus deformation resistance and tooth chipping resistance may be deteriorated during running of the belt. On the other hand, when the iodine value of the HNBR is large, the amount of unsaturated bonds becomes excessively large, and thermal degradation or oxidative degradation of the crosslinked rubber progresses, which may shorten a service life of the belt.

The rubber component preferably contains a composite polymer or a polymer alloy containing a hydrogenated nitrile rubber and an unsaturated carboxylic acid metal salt (hereinafter referred to as an "HNBR containing an unsaturated carboxylic acid metal salt"). The polymer can increase the elastic modulus (modulus) and hardness of the tooth portion, and can prevent the deformation of the rubber and prevent the growth of tooth root cracks.

The unsaturated carboxylic acid metal salt may be a compound in which an unsaturated carboxylic acid having one or more carboxyl groups is ionically bonded to a metal.

Examples of the unsaturated carboxylic acid of the unsaturated carboxylic acid metal salt include monocarboxylic acids such as a (meth) acrylic acid and a crotonic acid, dicarboxylic acids such as a maleic acid, a fumaric acid and an itaconic acid, and monoalkyl esters of these dicarboxylic acids. Those unsaturated carboxylic acids may be used alone or in combination of two or more kinds thereof. A preferred unsaturated carboxylic acid is the (meth) acrylic acid.

Examples of the metal of the unsaturated carboxylic acid metal salt include polyvalent metals, for example, elements in Group 2 of the periodic table (magnesium, calcium, and the like), elements in Group 4 of the periodic table (titanium, zirconium, and the like), and elements in Group 8 to Group 14 of the periodic table (for example, iron, cobalt, nickel, copper, zinc, aluminum, tin, lead, and the like). Those metals may be used alone or in combination of two or more kinds thereof. Preferred metals are elements in Group 2 of the periodic table (such as magnesium) and elements in Group 12 of the periodic table (such as zinc).

Preferred examples of the unsaturated carboxylic acid metal salt include zinc (meth) acrylate and magnesium (meth) acrylate. The unsaturated carboxylic acid metal salts may be used alone or in combination of two or more kinds thereof.

A mass ratio of the hydrogenated nitrile rubber to the unsaturated carboxylic acid metal salt can be selected from a range (hydrogenated nitrile rubber/unsaturated carboxylic acid metal salt) of about 100/80 to 100/180, preferably 100/85 to 100/175, and more preferably 100/90 to 100/175. If a proportion of the unsaturated carboxylic acid metal salt is too small, the elastic modulus (modulus) and hardness of the crosslinked rubber composition may decrease, and if the proportion is too large, the processability and bendability of the belt may be deteriorated.

The "HNBR containing an unsaturated carboxylic acid metal salt" may be a commercially available product. For example, a product (for example, trade name "Zeoforte (ZSC)" manufactured by Zeon Corporation) obtained by finely dispersing zinc methacrylate as an unsaturated carboxylic acid metal salt in the HNBR at a high degree can be used.

The "HNBR containing an unsaturated carboxylic acid metal salt" is preferably used as a mixture with a hydrogenated nitrile rubber (HNBR) containing no unsaturated carboxylic acid metal salt. The mass ratio of the hydrogenated nitrile rubber to the unsaturated carboxylic acid metal salt may be adjusted by mixing a commercially available "HNBR containing an unsaturated carboxylic acid metal salt" and a commercially available hydrogenated nitrile rubber. The elastic modulus (modulus) and the hardness may be adjusted by changing a mixing ratio of both.

A proportion of the "HNBR containing an unsaturated carboxylic acid metal salt" may be 10 mass % or more in the rubber component, and particularly in the case of a rubber composition for forming the tooth portion, is preferably 30 mass % or more, more preferably 50 mass % or more, still more preferably 80 mass % or more, and most preferably 90 mass % or more, and may be 100 mass %. The proportion may be a proportion to the product "Zeoforte (ZSC)".

As another rubber component combined with the "HNBR containing an unsaturated carboxylic acid metal salt", at least one selected from the group consisting of EPDM and CR is preferable. The proportion of another rubber component in the rubber component is 80 mass % or less, preferably 50 mass % or less, more preferably 30 mass % or less, and most preferably 10 mass % or less.

(B) Filling Compounding Agent

The crosslinked rubber composition may further contain a filling compounding agent. Examples of the filling compounding agent include a reinforcing filler, a non-reinforcing filler, and a short fiber.

Examples of the reinforcing filler include carbon black and silica. Those reinforcing fillers may be used alone or in combination of two or more kinds thereof. The reinforcing filler may be in a powder form. A proportion of the reinforcing filler may be 10 parts by mass or less, preferably 5 parts by mass or less, more preferably 1 part by mass, and still more preferably 0 part by mass with respect to 100 parts by mass of the rubber component. When the reinforcing filler is used as necessary, the proportion of the reinforcing filler may be, for example, 0.1 to 8 parts by mass, preferably 0.5 to 5 parts by mass, and more preferably 1 to 3 parts by mass with respect to 100 parts by mass of the rubber component. When the proportion of the reinforcing filler is too large, the heat generation of the rubber composition increases and the heat resistance decreases, and thus cracks and tooth chipping may occur due to thermal degradation.

Examples of the non-reinforcing filler include a polyvalent metal carbonate (such as calcium carbonate and magnesium carbonate), a polyvalent metal hydroxide (such as aluminum hydroxide), a polyvalent metal sulfate (such as barium sulfate), a silicate (natural or synthetic silicate in which part of silicon is substituted with polyvalent metal atoms, such as aluminum silicate, magnesium silicate, and aluminum magnesium silicate; a mineral containing the silicate as a main component, such as clay containing the aluminum silicate, and a silicate mineral such as talc and mica containing the magnesium silicate), lithopone, and silica sand. Those non-reinforcing fillers may be used alone or in combination of two or more kinds thereof. A preferred non-reinforcing filler is at least one selected from a calcium carbonate, a magnesium carbonate, an aluminum hydroxide, a barium sulfate, and a silicate (silicate such as aluminum silicate, magnesium silicate, and aluminum magnesium silicate, or a silicate mineral (talc, clay, mica, or the like)). Furthermore, from the viewpoint that an effect of improving the processability of the belt and the dispersibility of the compounding agent is increased and poor dispersion of the compounding agent hardly occurs, the non-reinforcing filler preferably contains at least one selected from the calcium carbonate, the magnesium silicate, talc containing the magnesium silicate, the aluminum silicate, and clay containing the aluminum silicate, and particularly preferably contains the calcium carbonate. As the non-reinforcing filler, a powdery filler commercially available as a rubber filler can be used.

An average particle diameter (average primary particle diameter) of the non-reinforcing filler can be selected from a range of, for example, 0.01 μm to 25 μm (for example, 0.2 μm to 20 μm), and preferably 0.5 μm to 17 μm (for example, 1 μm to 15 μm). The average particle diameter (average primary particle diameter) of the non-reinforcing filler may be, for example, 0.01 μm to 3 μm (for example, 0.02 μm to 2 μm), and preferably 0.05 μm to 1.5 μm (for example, 0.1 μm to 1 μm). The average particle diameter (average primary particle diameter) of the non-reinforcing filler may be relatively large, and may be, for example, 0.2 μm to 5 μm (for example, 0.3 μm to 3 μm), and preferably 0.5 μm to 2.5 μm (for example, 1 µm to 2 µm). Depending on the type of the non-reinforcing filler, for example, the magnesium silicate or a mineral thereof, the non-reinforcing filler may be cracked or crushed in a process of kneading with the rubber component or the like. The average particle diameter of the non-reinforcing filler having crushability or friability may be an average particle diameter before kneading with the rubber component or the like. The non-reinforcing filler may usually have an average particle diameter (for example, 0.1 µm to 10 µm, preferably 0.5 µm to 5 µm, and more preferably 1 µm to 3 µm) in the above range in each crosslinked rubber composition. The average particle diameter of the non-reinforcing filler can be measured as a volume average particle diameter using a laser diffraction particle size distribution analyzer. An average particle diameter of a nanometer-sized filler can be calculated as an arithmetic average particle diameter of an appropriate number of samples (for example, 50 samples) by image analysis of an electron micrograph including a scanning electron micrograph.

The proportion of the non-reinforcing filler is, for example, 70 parts by mass or less, preferably 40 parts by mass or less, and more preferably 30 parts by mass or less with respect to 100 parts by mass of the total amount of the rubber component. When the non-reinforcing filler is used as necessary, the proportion of the non-reinforcing filler may be, for example, 3 to 70 parts by mass, preferably 5 to 40 parts by mass, and more preferably 10 to 30 parts by mass with respect to 100 parts by mass of the rubber component. When the proportion of the non-reinforcing filler is too large, the dispersibility of the compounding agent may be poor.

Short fibers can be oriented (arranged) in a predetermined direction in a process of preparing an uncrosslinked rubber sheet by rolling a rubber composition kneaded with a Banbury mixer or the like with a roll or a calendar. In the tooth rubber layer constituting the tooth portion 3, an orientation direction of the short fibers is preferably arranged in the belt circumferential direction. Further, the short fibers are preferably oriented along the contour of the tooth portion 3 on a side close to the tooth fabric 6 and arranged such that the short fibers are oriented substantially parallel to the core wire 4 as the short fibers approach the core wire 4.

Examples of the short fibers include: synthetic fibers such as polyolefin fibers (polyethylene fibers, polypropylene fibers, and the like), polyamide fibers (polyamide 6 fibers, polyamide 66 fibers, polyamide 46 fibers, aramid fibers, and the like), polyester fibers [polyalkylene arylate fibers (for example, C2-4 alkylene C8-14 arylate fibers such as polyethylene terephthalate (PET) fibers, polytrimethylene terephthalate (PTT) fibers, polybutylene terephthalate (PBT) fibers, and polyethylene naphthalate (PEN) fibers); fully aromatic polyester fibers such as polyarylate fibers and liquid crystal polyester fibers, and the like], vinylon fibers, polyvinyl alcohol fibers, and polyparaphenylene benzobisoxazole (PBO) fibers; natural fibers such as cotton, hemp, and wool; regenerated cellulose fibers such as rayon; cellulose ester fibers, and inorganic fibers such as carbon fibers and glass fibers. Those short fibers may be used alone or in combination of two or more kinds thereof. In particular, fibers having a high elastic modulus (modulus) such as aramid fibers, PBO fibers, glass fibers, and carbon fibers can be suitably used.

An average fiber diameter of the short fibers is, for example, 1 µm to 100 µm (for example, 3 µm to 70 µm), preferably 5 µm to 50 µm (for example, 7 µm to 30 µm), and more preferably 10 µm to 25 µm (particularly 12 µm to 20 µm). An average fiber length of the short fibers is, for example, 0.3 mm to 10 mm (for example, 0.5 mm to 7 mm), and preferably 1 mm to 5 mm (particularly 2 mm to 4 mm).

When the short fibers are added, the elastic modulus (modulus) and hardness of the crosslinked rubber composition can be increased, but minute cracks are apt to occur at an interface between the rubber component and the short fibers. Therefore, it is necessary to adjust the blending amount of the short fibers appropriately. A proportion of the short fibers is 10 parts by mass or less, preferably 7 parts by mass or less, and more preferably 5 parts by mass or less with respect to 100 parts by mass of the rubber component.

(C) Crosslinking Compounding Agent

The rubber composition contains a crosslinking agent (vulcanizing agent) for crosslinking the rubber component, and optionally contains a co-crosslinking agent, a crosslinking aid (vulcanization aid), a crosslinking accelerator (vulcanization accelerator), a crosslinking retardant (vulcanization retardant), and the like as necessary. Among these, the crosslinking compounding agent preferably contains at least a crosslinking agent and a co-crosslinking agent (crosslinking aid), and a combination of the crosslinking agent and the co-crosslinking agent is particularly preferable.

As the crosslinking agent, commonly-used components can be used depending on the type of the rubber component, and examples thereof include an organic peroxide, a sulfur-based crosslinking agent, and a metal oxide.

(D) Other Compounding Agents

The rubber composition may further contain a commonly-used additive used for the rubber composition of the toothed belt 1. Examples of the commonly-used additive include metal oxides (calcium oxide, barium oxide, iron oxide, copper oxide, titanium oxide, aluminum oxide, and the like), softeners (oils such as paraffin oil, naphthenic oil, and the like), processing agents or processing aids (stearate or metal salts thereof, wax, paraffin, fatty acid amide, and the like), plasticizers [aliphatic carboxylic acid plasticizers (adipic acid ester plasticizers, sebacic acid ester plasticizers, and the like), aromatic carboxylic acid ester plasticizers (phthalic acid ester plasticizers, trimellitic acid ester plasticizers, and the like), oxycarboxylic acid ester plasticizers, phosphoric acid ester plasticizers, ether plasticizers, ether ester plasticizers, and the like], age resisters (antioxidants, thermal age resisters, anti-flex-cracking agents, antiozonants, and the like), colorants, tackifiers, plasticizers, coupling agents (silane coupling agents and the like), stabilizers (ultraviolet absorbers, thermal stabilizers, and the like), flame retardants, antistatic agents, and the like. The rubber composition may optionally contain an adhesiveness improving agent (resorcin-formaldehyde co-condensate, amino resin, and the like). These additives may be used alone or in combination of two or more kinds thereof.

The crosslinked rubber composition used for the tooth portion 3 in the embodiment preferably has a storage modulus (E') of 200 MPa to 300 MPa at an ambient temperature of 70° C. measured in accordance with JIS K6394 (2007) and a loss coefficient (Tan δ) of 0.1 to 0.2. Within the range, a failure such as tooth chipping is less likely to occur, and deformation of the tooth portion 3 is prevented. Therefore, the meshing with the toothed pulley (drive pulley and driven pulley) is not hindered, and the durability is improved.

The E' is the elastic modulus obtained from a dynamic test with periodic vibration, and is defined as a ratio of elastic stress in phase with strain. As the E' increases, an object is less likely to be deformed, and the amount of deformation is smaller even with a strong external force such as a high load condition, so that cracking, cutting, or the like is less likely to occur. On the other hand, when the E' decreases, the object is easily deformed, and thus the object is easily cut and broken even with a small external force.

The Tan δ is calculated by dividing a loss modulus (E") by the E', and is a measure of a ratio between energy dissipated as heat during one vibration cycle and stored maximum energy. That is, the Tan δ represents the degree of ease with which vibration energy applied to the rubber composition is dissipated as heat. As the Tan δ increases, more energy applied from the outside is converted into heat, and thus the temperature of the rubber composition rises due to self-heating, and the heat resistance decreases. On the other hand, as the Tan δ decreases, a calorific value is kept low, and thus the heat resistance of the rubber composition is improved.

[Reinforcing Layer5]

As shown in FIG. 1 to FIG. 3, the reinforcing layer 5 is buried in the toothed belt 1 (mainly the tooth portion 3) between the first rubber layer 33 and the second rubber layer 34 along the shape (approximate contour) of the tooth portion 3. A position in a belt thickness direction at which the reinforcing layer 5 is buried in the tooth portion 3 may be in a region in which a maximum height H2 (hereinafter, a position H2 of the reinforcing layer 5) from the bottom portion 31 (including the tooth fabric 6) of the tooth portion 3 to the reinforcing layer 5 is 30% to 100% (H2/H1=0.3 to 1.0) of a height H1 (hereinafter, a tooth height H1) from the bottom portion 31 of the tooth portion 3 to a tooth tip 32 (including the tooth fabric 6), and is more preferably in a region of 50% to 100% (H2/H1=0.5 to 1.0). When the position H2 of the reinforcing layer 5 is too small (when the position H2 of the reinforcing layer 5 is too close to the core wire 4), the bending rigidity becomes too large. By adjusting the position to the predetermined region, it is possible to suitably adjust the balance between the tooth rigidity and the bending rigidity, which are in a contradictory relationship, of the toothed belt 1, and it is possible to secure sufficient tooth root crack (tooth chipping) resistance while securing the bendability.

When the position H2 of the reinforcing layer 5 is 100% of the tooth height H1 (H2/H1=1.0), the reinforcing layer 5 is in contact with the tooth fabric 6. That is, the tooth rubber layer includes only the second rubber layer 34, and the first rubber layer 33 is not present.

The reinforcing layer 5 includes a plurality of reinforcing fiber filaments 51 arranged in the belt circumferential direction (see FIG. 4), and a weight per unit area of fibers intersecting the belt circumferential direction is 30% or less of the reinforcing fiber filaments 51. Alternatively, the reinforcing layer 5 may not include any fiber intersecting the belt circumferential direction. Accordingly, it is possible to ensure substantially the same bendability as in the case where the reinforcing layer 5 is not provided. That is, a decrease in bendability of the toothed belt 1 can be prevented.

Further, the reinforcing layer 5 has a structure in which the reinforcing fiber filaments 51 are arranged in the belt circumferential direction and bonded to form a sheet shape in an untwisted state. Accordingly, a thickness of the reinforcing layer 5 can be reduced. Therefore, it is possible to further prevent a decrease in bendability. In the embodiment, the term "untwisted" means that the twist number is 1 time/10 cm or less.

Since the reinforcing fiber filaments 51 are buried in the untwisted state, it is difficult to generate heat due to friction between fibers during bending. By preventing the decrease in bendability, it is possible to prevent heat generation of the toothed belt 1 due to bending when the toothed belt 1 is wound around or separated from the toothed pulley (drive pulley and driven pulley). Therefore, it is possible to prevent the temperature rise of the toothed belt 1 during running. By preventing the temperature rise of the toothed belt 1, the toothed belt 1 can have a longer service life.

Specifically, the reinforcing layer 5 is made of one or a plurality of laminated unidirectional fiber sheets 50 (UD sheets). When each of the unidirectional fiber sheets 50 has the same configuration, as the number of the unidirectional fiber sheets 50 constituting the reinforcing layer 5 increases, the tooth root crack (tooth chipping) resistance can be improved. In the case where each of the unidirectional fiber sheets 50 has the same configuration, as the number of the unidirectional fiber sheets 50 constituting the reinforcing layer 5 is smaller, the decrease in bendability of the toothed belt 1 can be prevented.

Figure 4:
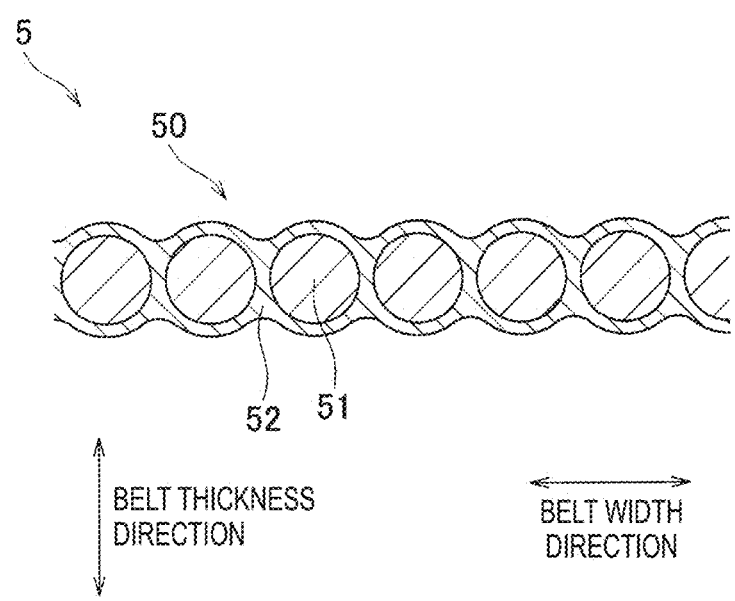
FIG. 4 is a cross-sectional view of a reinforcing layer according to the embodiment in a belt width direction.

As shown in FIG. 4, the unidirectional fiber sheet 50 has a plurality of reinforcing fiber filaments 51 arranged in the belt circumferential direction and bonded in a sheet shape. For example, a density of the reinforcing fiber filaments 51 in the belt width direction in the unidirectional fiber sheet 50 may be about $1 \times 10^9$ to $1 \times 10^{11}$ filaments/5 cm. The reinforcing fiber filaments 51 are arranged in untwisted state. Accordingly, it is possible to prevent orientation of the reinforcing fiber filaments 51 from being disturbed.

The reinforcing fiber filaments 51 are bonded to each other with a thermosetting resin 52. The thermosetting resin 52 is impregnated into the reinforcing fiber filaments 51. Examples of the thermosetting resin 52 include an epoxy resin, a phenol resin, a melamine resin, a urea resin, a polyurethane resin, and a polyimide resin, and among them, the epoxy resin is preferable.

Alternatively, the thermosetting resin 52 may be a cured product produced by a method of treating with a resorcin-formalin-latex liquid (RFL liquid) containing a condensate of resorcin and formaldehyde. The RFL treatment is a treatment in which the reinforcing fiber filaments 51 are immersed in the RFL liquid and then subjected to heat treatment to adhere a thermosetting resin component in the RFL liquid to the reinforcing fiber filaments 51.

The RFL liquid is obtained by mixing an initial condensate of resorcin and formalin in a latex, and a styrene-butadiene-vinylpyridine terpolymer, hydrogenated nitrile rubber, chlorosulfonated polyethylene, epichlorohydrin, or the like is used as the latex.

The reinforcing layer 5 contains the fibers intersecting the belt circumferential direction only in an amount of 30% or less of the weight per unit area of the reinforcing fiber filaments 51. Alternatively, the reinforcing layer may not include any fiber intersecting the belt circumferential direction.

The reinforcing layer 5 has a thickness of 0.05 mm to 0.2 mm. The thickness of the reinforcing layer 5 also includes a thickness of the thermosetting resin 52 covering the periphery of the reinforcing fiber filaments 51. When the thickness of the reinforcing layer 5 exceeds 0.2 mm, bending fatigue resistance may deteriorate due to an increase in bending rigidity (decrease in bendability). In the embodiment, by setting the thickness of the reinforcing layer 5 to 0.2 mm or less, it is possible to reliably prevent decrease of bending fatigue resistance due to a decrease in bendability. On the other hand, when the thickness of the reinforcing layer 5 is less than 0.05 mm, sufficient tooth root crack (tooth chipping) resistance may not be ensured. In the embodiment, since the untwisted reinforcing fiber filaments 51 have a high effect of improving the tooth root crack (tooth chipping) resistance, even when the reinforcing layer 5 is as thin as 0.05 mm to 0.2 mm, sufficient tooth root crack (tooth chipping) resistance can be ensured while preventing a decrease in bending fatigue resistance. In the embodiment, the "thickness of the reinforcing layer 5" refers to a thickness of each reinforcing layer 5 even when there are a plurality of reinforcing layers 5.

A weight per unit area of the unidirectional fiber sheet 50 containing the thermosetting resin 52 is preferably 50 to 400 g/m². When the weight per unit area of the unidirectional fiber sheet 50 is less than 50 g/m², the number of the unidirectional fiber sheets 50 constituting the reinforcing layer 5 required to ensure sufficient tooth root crack (tooth chipping) resistance increases, and the workload required for manufacturing the toothed belt 1 increases. The weight per unit area of the unidirectional fiber sheet 50 is preferably 50 g/m² or more. Accordingly, the reinforcing layer 5 made of one or a small number of unidirectional fiber sheets 50 can ensure sufficient tooth root crack (tooth chipping) resistance. When the weight per unit area of the unidirectional fiber sheet 50 is more than 400 g/m², the thickness of the reinforcing layer 5 may become too large and the bendability may decrease even when the reinforcing layer 5 is made of one unidirectional fiber sheet 50. The weight per unit area of the unidirectional fiber sheet 50 is preferably 400 g/m² or less, and more preferably 200 g/m² or less (particularly 100 g/m² or less). Accordingly, the decrease in bendability can be prevented.

A diameter of the reinforcing fiber filament 51 is not particularly limited, but is, for example, about 0.1 μm to 50 μm, and preferably about 5 μm to 25 μm. When a fiber diameter is too small, handling becomes difficult, and when the fiber diameter is too large, the bendability of the belt may be deteriorated.

A tensile modulus (GPa) (Young's modulus) of the reinforcing fiber filament 51 satisfies the condition that the "index Z" defined by "index Z=[thickness (mm) of reinforcing layer]×[tensile modulus (unidirectional fiber elastic modulus) (GPa) of reinforcing fiber filament]" is "$5 \leq \text{index } Z \leq 60$" (preferably $10 \leq \text{index } Z \leq 60$) When the tensile modulus of the reinforcing fiber filament 51 included in the reinforcing layer 5 satisfies a condition that the "index Z", which is an index value representing the rigidity of the reinforcing layer 5, is 5 or more and 60 or less, sufficient tooth root crack resistance can be ensured while preventing a decrease in bending fatigue resistance in a range of the thickness of the reinforcing layer 5 of 0.05 mm to 0.2 mm.

Further, the tensile modulus of the reinforcing fiber filament 51 is preferably 50 GPa to 300 GPa. When the tensile modulus of the reinforcing fiber filament 51 is less than 50 GPa, the sufficient tooth root crack (tooth chipping) resistance may not be ensured. In order to obtain a sufficient reinforcing effect, it is necessary to make the thickness of the reinforcing layer 5 larger than 0.2 mm. However, when the thickness is increased, the bending fatigue resistance deteriorates due to an increase in bending rigidity (decrease in bendability). Therefore, by setting the tensile modulus of the reinforcing fiber filament 51 used for the unidirectional fiber sheet 50 to 50 GPa or more, it is possible to ensure the sufficient tooth root crack (tooth chipping) resistance while preventing a decrease in bending fatigue resistance by reducing the thickness of the reinforcing layer 5 (0.05 mm to 0.2 mm).

When the tensile modulus of the reinforcing fiber filament 51 is 300 GPa or less, the effect of preventing the above described failure can be secured, and the toothed belt 1 can have a longer service life.

For example, when the thickness of the reinforcing layer 5 is 0.05 mm, the tensile modulus of the reinforcing fiber filament 51 is 100 GPa to 1200 GPa ($5 \leq \text{index } Z \leq 60$), preferably 200 GPa to 1200 GPa ($10 \leq \text{index } Z \leq 60$), and more preferably 100 GPa to 300 GPa (further preferably 200 GPa to 300 GPa) based on an upper limit value and a lower limit value (50 GPa to 300 GPa) of the tensile modulus of the reinforcing fiber filament 51.

When the thickness of the reinforcing layer 5 is 0.10 mm, the tensile modulus of the reinforcing fiber filament 51 is 50 GPa to 600 GPa ($5 \leq \text{index } Z \leq 60$), preferably 100 GPa to 600 GPa ($10 \leq \text{index } Z \leq 60$), and more preferably 50 GPa to 300 GPa (further preferably 100 GPa to 300 GPa) based on an upper limit value and a lower limit value (50 GPa to 300 GPa) of the tensile modulus of the reinforcing fiber filament 51.

When the thickness of the reinforcing layer 5 is 0.20 mm, the tensile modulus of the reinforcing fiber filaments 51 is 25 GPa to 300 GPa ($5 \leq \text{index } Z \leq 60$), and preferably 50 GPa to 300 GPa ($10 \leq \text{index } Z \leq 60$).

Thermal conductivity of the reinforcing fiber filament 51 is preferably 5.0 W/(m·K) or more. An upper limit of the thermal conductivity of the reinforcing fiber filaments 51 is not particularly limited, but may be about 20 W/(m·K).

The type of fiber of the reinforcing fiber filament 51 is not particularly limited, and examples thereof include carbon fiber, glass fiber, aramid fiber, polyamide fiber, and polyester fiber. Among these, the carbon fiber and the aramid fiber are preferable because of a high tensile modulus thereof, and the carbon fiber is particularly preferable because of a high tensile modulus and a high thermal conductivity thereof. The type of fibers of the reinforcing fiber filaments 51 constituting the unidirectional fiber sheet 50 may be one type or a plurality of types. Specific examples of the carbon fibers constituting the unidirectional fiber sheet 50 include "Torayca" manufactured by Toray Industries, Inc., "Tenax" manufactured by Teijin Limited, and "Pyrofil" manufactured by Mitsubishi Chemical Corporation. As the unidirectional fiber sheet 50, a sheet may be produced by bonding the arranged carbon fiber filaments with a resin, or a commercially available product may be used. Specific examples of the commercially available product include "Torayca Prepreg" manufactured by Toray Industries, Inc. and "Pyrofil Prepreg" manufactured by Mitsubishi Chemical Corporation.

Specific examples of the aramid fibers constituting the unidirectional fiber sheet 50 include "Kevlar" manufactured by Toray Industries, Inc., and "Twaron (registered trademark)", "Conex", and "Nomex" manufactured by Teijin Limited. A specific example of a commercially available product of the unidirectional fiber sheet 50 is a "FiBRA Sheet" manufactured by Fibex Co.

An adhesive component (not shown) may be adhered to the reinforcing layer 5 by an adhesion treatment for enhancing adhesiveness to a surrounding rubber layer (tooth portion 3). Although the thermosetting resin 52 covering a surface of the reinforcing fiber filament 51 can ensure adhesiveness to the rubber layer without performing the adhesion treatment, it is preferable to perform the adhesion treatment in order to further improve the adhesiveness. The adhesion treatment includes the RFL treatment and the rubber cement treatment (soaking treatment) described above. The RFL treatment is a treatment in which the unidirectional fiber sheet 50 is immersed in the RFL liquid and then subjected to heat treatment to adhere an adhesive component (resin component containing an RF condensate) to the unidirectional fiber sheet 50. As described above, in the case where the thermosetting resin 52 is a thermosetting resin component (resin component containing an RF condensate) generated by the treatment with the RFL liquid, no additional adhesion treatment with the RFL is required. The rubber cement treatment is a treatment in which an unvulcanized rubber composition is dissolved in a solvent into a rubber cement state, the obtained rubber cement is applied to the surface of the unidirectional fiber sheet 50, and then the solvent is evaporated to form a film (adhesive component) of the unvulcanized rubber composition on the surface of the unidirectional fiber sheet 50. The rubber cement treatment may be performed after the adhesion treatment using the RFL liquid.

[Tooth Fabric 6]

The tooth fabric 6 constituting the inner circumferential belt surface (surfaces of the tooth portion 3 and the tooth bottom portion 7) may be made of, for example, a fabric such as a woven fabric, a knitted fabric, or a nonwoven fabric. In general, the woven fabric (canvas) is often used, and the woven fabric is formed by weaving warps extending in the belt width direction and wefts extending in the belt circumferential direction. A weave structure of the woven fabric is not particularly limited as long as warps and wefts regularly intersect in vertical and horizontal directions, may be any of plain weave, twill weave, and satin weave, and may be a weave structure in which these structures are combined. A preferred woven fabric has twill weave and satin weave.

Examples of fibers for forming wefts and warps of the tooth fabric 6 include polyphenylene ether fibers, polyetheretherketone fibers, polyethersulfone fibers, and polyurethane fibers in addition to the same fibers as the short fibers. Those fibers may be used alone or in combination of two or more kinds thereof. Among those fibers, organic fibers are widely used, and cellulose fibers such as cotton and rayon, polyester fibers (PET fibers and the like), polyamide fibers (aliphatic polyamide fibers such as polyamide 66 fibers, aramid fibers and the like), PBO fibers, and fluororesin fibers [polytetrafluoroethylene (PTFE) fibers and the like] are preferable. In addition, composite yarns of those fibers and stretchable elastic yarns (for example, a stretchable polyurethane elastic yarn such as spandex made of polyurethane, a textured yarn subjected to stretch processing (for example, woolly processing, crimping processing, or the like)) are also preferable.

The form of each of the warp and the weft is not particularly limited, and may be a monofilament yarn which is a single long fiber, a multifilament yarn in which filaments (long fibers) are aligned or twisted, a spun yarn in which short fibers are twisted, or the like. The multifilament yarn or the spun yarn may be a twisted yarn or a blended yarn using a plurality of types of fibers. The weft preferably contains the stretchable elastic yarn, and the warp usually does not contain the elastic yarn from the viewpoint of weaving properties. In order to ensure stretchability of the tooth fabric 6 in the belt circumferential direction, the weft including the elastic yarn extends in the belt circumferential direction, and the warp extends in the belt width direction.

An average diameter of fibers (or yarns) is, for example, 1 µm to 100 µm (for example, 3 µm to 50 µm), preferably 5 µm to 30 µm, and more preferably 7 µm to 25 µm. Regarding an average fiber diameter (thickness) of a yarn (twisted yarn), the weft may be, for example, about 100 dtex to 1000 dtex (particularly, 300 dtex to 700 dtex), and the warp may be, for example, about 50 dtex to 500 dtex (particularly, 100 dtex to 300 dtex). A weft density (threads/cm) may be, for example, about 5 to 50 (particularly about 10 to 30), and a warp density (threads/cm) may be, for example, about 10 to 300 (particularly about 20 to 100).

The woven fabric may have a multiple weave structure (such as a double weave structure), and in a weave structure including warps and wefts, at least some of the wefts may be made of fibers (or low-friction fibers) having a low friction coefficient such as fluororesin-containing fibers (such as composite yarns including fibers made of a fluororesin such as PTFE). For example, the warp may be made of a polyamide fiber such as nylon 66, a polyester fiber, or the like, and the weft may be made of a single fiber made of the fluororesin; a composite yarn of the fiber made of the fluororesin and a second fiber such as a polyamide fiber or a polyurethane fiber (elastic yarn); or a composite yarn of the composite yarn and a second composite yarn made of a plurality of second fibers.

In this aspect, among the wefts, it is preferable to use a fluorine-based fiber (for example, a PTFE fiber) having a low friction coefficient as a weft located (exposed) on a surface side of the tooth fabric 6 (side meshing with the toothed pulley) in order to reduce friction between the tooth fabric 6 and the toothed pulley. On the other hand, by using fibers (nylon fibers or urethane elastic yarns) other than the fluorine-based fiber for the wefts located on a back surface side (side adhered to the tooth rubber layer) of the tooth fabric 6, it is possible to increase the adhesive force between the tooth fabric 6 and the rubber constituting the tooth portion 3. With the tooth fabric 6 in this aspect, friction caused by meshing between the tooth fabric 6 and the toothed pulley can be reduced, and noise generation can be prevented.

A low-melting-point fiber having a melting point that melts at a crosslinking (vulcanization) temperature of the tooth portion 3 and the back portion 2, which are made of rubber as a base material, is preferably arranged around the fluorine-based fiber. Specifically, examples thereof include a form in which the fluorine-based fiber and the low-melting-point fiber are twisted, or a form in which the fluorine-based fiber is covered with the low-melting-point fiber. Crosslinking (vulcanization) conditions of the tooth portion 3 and the back portion 2 are not particularly limited, and are generally a crosslinking (vulcanization) temperature of 100° C. to 200° C. and a crosslinking (vulcanization) time of about 1 minute to 5 hours.

In this case, the low-melting-point fiber melts during crosslinking (vulcanization) of the tooth portion 3 and the back portion 2, flows into the fibers constituting the tooth fabric 6, and then is cooled to the melting point or less, whereby the low-melting-point fiber is crystallized. Therefore, at the time of engagement with the toothed pulley or disengagement from the toothed pulley, the fluorine-based fiber is prevented from being cut and scattered due to impact or abrasion generated on a surface of the tooth fabric 6. Accordingly, it is possible to protect the tooth portion 3 and the back portion 2 for a longer period of time, to prevent tooth chipping of the belt, and to extend the service life during high-load running.

The tooth fabric 6 (tooth fabric 6 in the toothed belt 1) has an average thickness of, for example, 0.1 mm to 2 mm, and preferably 0.2 mm to 1.5 mm. A tooth fabric (tooth fabric before molding) as a raw material has an average thickness of, for example, 0.5 mm to 3 mm, and preferably 0.75 mm to 2.5 mm.

In order to enhance adhesiveness to the first rubber layer 33, the fabric for forming the tooth fabric 6 may be subjected to an adhesion treatment. Examples of the adhesion treatment include a method in which the fabric is immersed in the RFL treatment liquid and then heated and dried; a method in which the fabric is treated with an epoxy compound or an isocyanate compound; a method in which a rubber composition is dissolved in an organic solvent to form a rubber cement, the fabric is immersed in the rubber cement, and then heated and dried; and a method in which these treatment methods are combined. These methods can be performed alone or in combination, and the processing order and the number of times of processing are not limited. For example, the fabric may be pretreated with an epoxy compound or an isocyanate compound, immersed in an RFL treatment liquid, and then heated and dried.

Further, for the purpose of enhancing the adhesiveness between the tooth fabric 6 and the first rubber layer 33, an uncrosslinked rubber sheet obtained by rolling the rubber composition may be laminated on a back surface side (side adhered to the tooth rubber layer) of the fabric for forming the tooth fabric 6. The rubber composition (crosslinked rubber composition) can be appropriately selected from the crosslinked rubber compositions exemplified as the crosslinked rubber composition for forming the tooth rubber layer (first rubber layer 33 and second rubber layer 34), and may be a commonly-used adhesive rubber composition. The uncrosslinked rubber sheet made of the rubber composition may form a third rubber layer (adhesive rubber layer) interposed between the tooth fabric 6 and the first rubber layer 33 in the toothed belt 1. The fabric subjected to the above adhesion treatment is referred to as a tooth fabric precursor.

[Back Portion 2 (Back Rubber Layer 21)]

The back portion 2 has the tooth portion 3 and the tooth bottom portion 7 formed on an inner circumferential surface thereof, and has the back rubber layer 21 forming an outer circumferential belt surface on an outer circumferential surface side thereof. Further, the back rubber layer 21 is made of the rubber composition (crosslinked rubber composition). In the aspect shown in FIG. 1 to FIG. 3, the other surface (back surface of the belt) on which the tooth portion 3 is not formed is not covered with a fabric (woven fabric, knitted fabric, unwoven fabric, or the like), but may be covered as necessary. The fabric can be selected from the fabrics exemplified as the tooth fabric 6, including a preferred mode thereof.

The hardness of the back portion 2 (back rubber layer 21) is preferably smaller than the hardness of the tooth portion 3 from the viewpoint of reducing the bending rigidity of the belt and ensuring bendability (winding property with respect to the pulley) and bending fatigue resistance. Specifically, the rubber hardness Hs of the crosslinked rubber composition for forming the back rubber layer 21 is, for example, 80 degrees to 89 degrees in the JIS-A hardness. The JIS-A hardness is the hardness of a surface of the back rubber layer 21, and can be measured using the type A durometer in accordance with JIS K6253 (2012). By adjusting the JIS-A hardness of the back rubber layer 21 to the above range, the bending rigidity of the back portion 2 is lowered, and excellent bending fatigue resistance is obtained. If the JIS-A hardness of the back portion 2 is too low, cracks may occur in the back portion 2 due to collision of foreign matter or the like. On the other hand, if the JIS-A hardness is too high, the bending fatigue resistance decreases, and cracks may occur in the back portion 2.

The rubber composition for forming the back portion 2 (back rubber layer 21) is not particularly limited as long as the adhesion between the back portion 2 and the tooth portion 3 is not impaired, can be selected from, for example, the crosslinked rubber compositions exemplified as the crosslinked rubber composition of the tooth rubber layer, and can be appropriately adjusted so that the rubber hardness falls within the above range. The back portion 2 may be made of a rubber composition different from that of the tooth portion 3, or may be made of the same rubber composition. Generally, the back portion 2 and the tooth portion 3 often contain the same series of rubbers or polymers, or the same type of rubber component.

In particular, in the crosslinked rubber composition constituting the back rubber layer 21, the rubber component preferably contains the same series or the same type of rubber component as the second rubber layer 34 (inner rubber layer), and more preferably the same type of rubber component, from the viewpoint of improving the adhesion between the back rubber layer 21 and the tooth portion 3.

An average thickness of the back rubber layer 21 is, for example, 0.3 mm to 3 mm, and preferably 0.5 mm to 2 mm. The average thickness of the back portion 2 (average thickness of the back portion 2 in the tooth bottom portion 7) is, for example, 1 mm to 5 mm, and preferably 1.5 mm to 4 mm.

Core Wire 4

The core wire 4 extending along the belt circumferential direction is buried in the back portion 2 on the inner circumferential side of the back rubber layer 21. The core wire 4 acts as a tension member, and can improve stability and strength during running of the toothed belt 1. Further, in the back portion 2, the core wires 4, which are twisted cords extending along the belt circumferential direction, are usually buried at predetermined intervals in the belt width direction, and a plurality of the core wires 4 may be arranged parallel to the belt circumferential direction, but are usually buried in a spiral shape from the viewpoint of productivity. In the case of the spiral arrangement, an angle of the core wire 4 with respect to the belt circumferential direction may be, for example, 5° or less, and it is more preferable that the angle is closer to 0° from the viewpoint of belt running performance.

More specifically, as shown in FIG. 1, the core wires 4 may be buried at predetermined intervals (or pitches) (or at equal intervals) from one end to the other end of the back portion 2 in the belt width direction. An interval (spinning pitch), which is a distance between centers of adjacent ones of the core wires 4, is larger than a diameter of the core wire 4, and is, for example, 0.5 mm to 3.5 mm, preferably 0.8 mm to 3 mm, and more preferably 1 mm to 2.8 mm depending on the diameter of the core wire 4.

The core wire 4 may be made of twisted cords obtained by twisting a plurality of strands or multifilament yarns. Among those, the twisted cord of strands is preferable, and one strand may be formed by bundling filaments (long fibers). The thickness of the filament for forming the twisted cord, the number of bundled filaments, the number of strands, and the twist configuration of the twist method are not particularly limited.

The twisted cords for forming the core wire 4 may be single-twisted cords, plied cords, or Lang-twisted cords. By making the core wire 4 a Lang-twisted cord in which a primary-twist direction and a secondary-twist direction are the same, the bending rigidity of the core wire 4 is lower than that of a plied or single-twisted cord, and excellent bending fatigue resistance is obtained.

Fibers for forming the core wire 4 are not particularly limited, and examples thereof include synthetic fibers such as polyester fibers (polyalkylene arylate fibers and polyparaphenylene naphthalate fibers), polybenzoxazole fibers, acrylic fibers, and polyamide fibers (aliphatic polyamide fibers and aramid fibers), and inorganic fibers such as glass fibers, carbon fibers, and metal fibers (steel fibers). Those fibers may be used alone or in combination of two or more kinds thereof. As the fibers for forming the core wire, synthetic fibers such as polyester fibers and polyamide fibers, inorganic fibers such as glass fibers and carbon fibers, and the like are widely used from the viewpoint of low elongation and high strength.

In particular, in applications where a high load acts, a multifilament yarn made of the carbon fibers is preferably used. As the carbon fibers, for example, trade name "Torayca" manufactured by Toray Industries, Inc. is used.

The multifilament yarn made of the carbon fibers can be selected from multifilament yarns having different numbers of filaments, such as 6K and 12K. The 6K represents a multifilament yarn having 6000 filaments, and the 12K represents a multifilament yarn having 12000 filaments. A 6K multifilament yarn has fineness of about 400 tex, and a 12K multifilament yarn has fineness of about 800 tex.

When the fineness of the multifilament yarn made of the carbon fibers is more than 1000 tex, the bending fatigue resistance may decrease. On the other hand, when the fineness of the multifilament yarn made of the carbon fibers is less than 300 tex, the material cost increases, and the number of primarily-twisted yarns required to produce the core wire 4 having sufficient tensile strength increases, resulting in an increase in workload.

In the embodiment, a carbon fiber cord (12K-1/0) obtained by single-twisting one 12K multifilament yarn (fineness of about 800 tex) is used as the core wire 4. Alternatively, a Lang-twisted carbon fiber cord (12K-1/4) obtained by primarily twisting one 12K multifilament yarn (fineness of about 800 tex) to prepare a primarily-twisted yarn, and secondarily twisting four prepared primarily-twisted yarns together may be used as the core wire 4. The "12K-1/0" indicates a twisted cord obtained by single-twisting one 12K multifilament yarn, and the "12K-1/4" indicates a twisted cord obtained by primarily twisting one 12K multifilament yarn to prepare a primarily-twisted yarn, and secondarily twisting four prepared primarily-twisted yarns together. Similarly, for example, "12K-1/3" indicates a twisted cord obtained by primarily twisting one 12K multifilament yarn to prepare a primarily-twisted yarn, and secondarily twisting three prepared primarily-twisted yarns together, and "12K-4/0)" indicates a twisted cord obtained by single-twisting four 12K multifilament yarns together.

The core wire 4 may be subjected to an adhesion treatment in order to enhance adhesiveness to the back rubber layer 21 and the second rubber layer 34. The method of the adhesion treatment may be, for example, a method in which the twisted cord is immersed in a resorcin-formalin-latex treatment liquid (RFL treatment liquid) and then heated and dried to form a uniform adhesive layer on a surface of the twisted cord. The RFL treatment liquid is a mixture obtained by mixing an initial condensate of resorcin and formalin in a latex, and the latex may be, for example, chloroprene rubber, styrene-butadiene-vinylpyridine terpolymer (VP latex), nitrile rubber, hydrogenated nitrile rubber, or the like. Further, the method of the adhesion treatment may be a method of performing pretreatment with an epoxy compound or an isocyanate compound and then treating with an RFL treatment liquid.

An average diameter (average wire diameter) of the twisted cord (or the core wire 4) is, for example, about 0.2 mm to 2.5 mm. In the application where a particularly high load acts, the average diameter is 1.0 mm to 2.5 mm, preferably 0.5 mm to 2.3 mm, and more preferably from 0.7 mm to 2.2 mm. In the application where a particularly high load acts, the average diameter is preferably 0.8 mm to 2.1 mm. If the core wire diameter is too small, the elongation of the core wire 4 increases, which may cause tooth chipping (chipping of the tooth portion 3). If the core wire diameter is too large, core wire cutting may occur due to a decrease in bending fatigue resistance of the core wire 4. In an embodiment of the specification, the core wire diameter is adjusted to 1.1 mm.

Method for Manufacturing Toothed Belt

The toothed belt 1 of the embodiment may be produced by, for example, the following method (preforming method).

First, a unidirectional fiber sheet for forming the reinforcing layer 5, a tooth fabric precursor for forming the tooth fabric 6, an uncrosslinked rubber sheet for forming the first rubber layer 33 (surface rubber layer), an uncrosslinked rubber sheet for forming the second rubber layer 34 (inner rubber layer), and an uncrosslinked rubber sheet for forming the back rubber layer 21 are prepared.

(Preforming Step)

Figure 5:
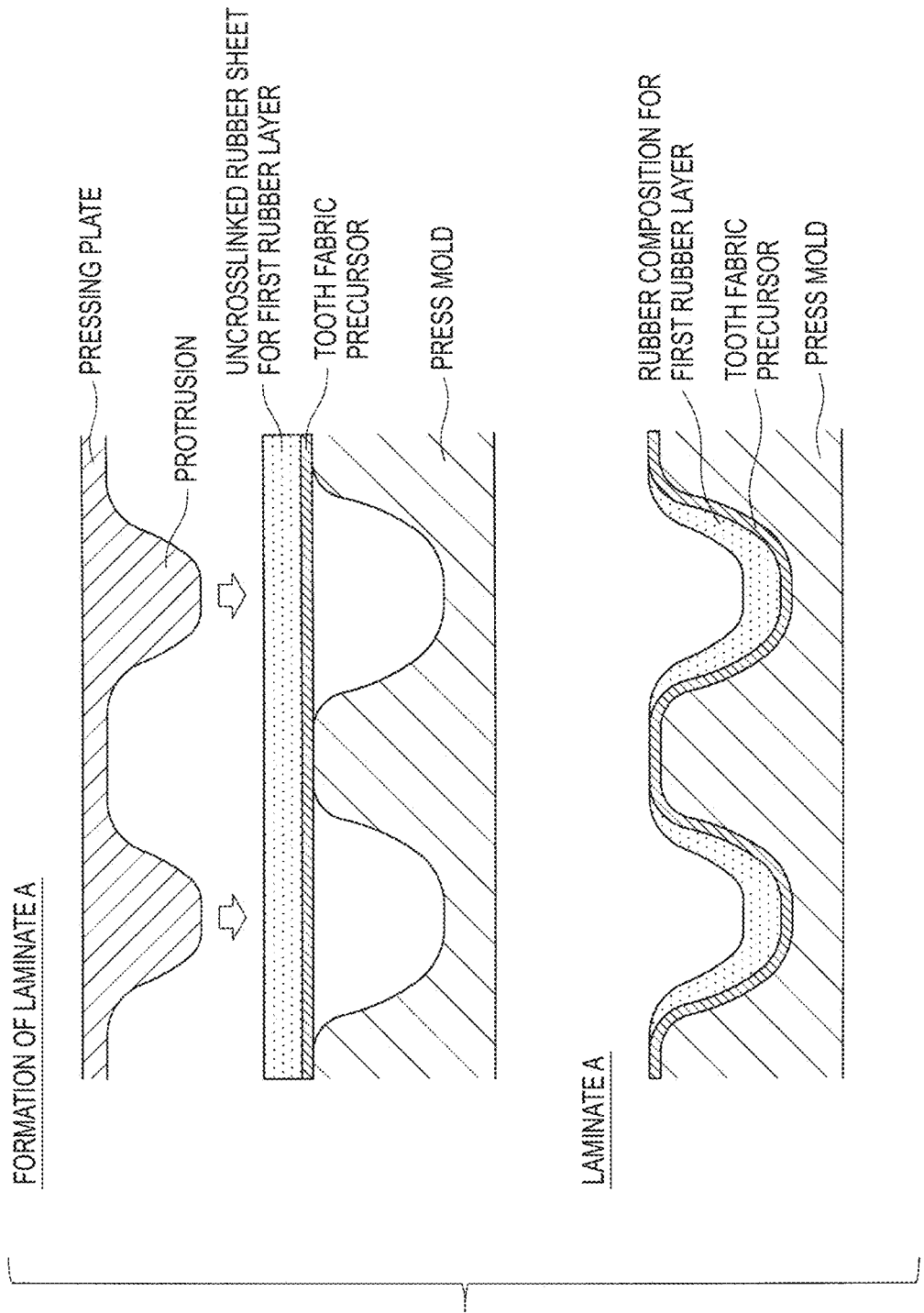
FIG. 5 is an explanatory view of a preforming step according to a method for manufacturing a toothed belt.

Next, as shown in FIG. 5, the tooth fabric precursor for forming the tooth fabric 6 is laid in a press mold (flat mold) having a plurality of grooves (concave shape) in a lower die corresponding to the tooth portions 3 of the toothed belt 1. Subsequently, the uncrosslinked rubber sheet for forming the first rubber layer 33 is laminated on an upper surface of the tooth fabric precursor to produce a laminate A. Then, the laminate A is pressurized by a pressing plate having protrusions (convex shape) corresponding to the plurality of grooves while being heated to a temperature (for example, about 70° C. to 90° C.) at which the rubber composition is softened, and the laminate A is press-fitted into the grooves to obtain a predetermined shape. At this time, the shape of the protrusions of the pressing plate is adjusted to a shape corresponding to the shape and the position H2 of the reinforcing layer 5 to be arranged later.

Figure 6:
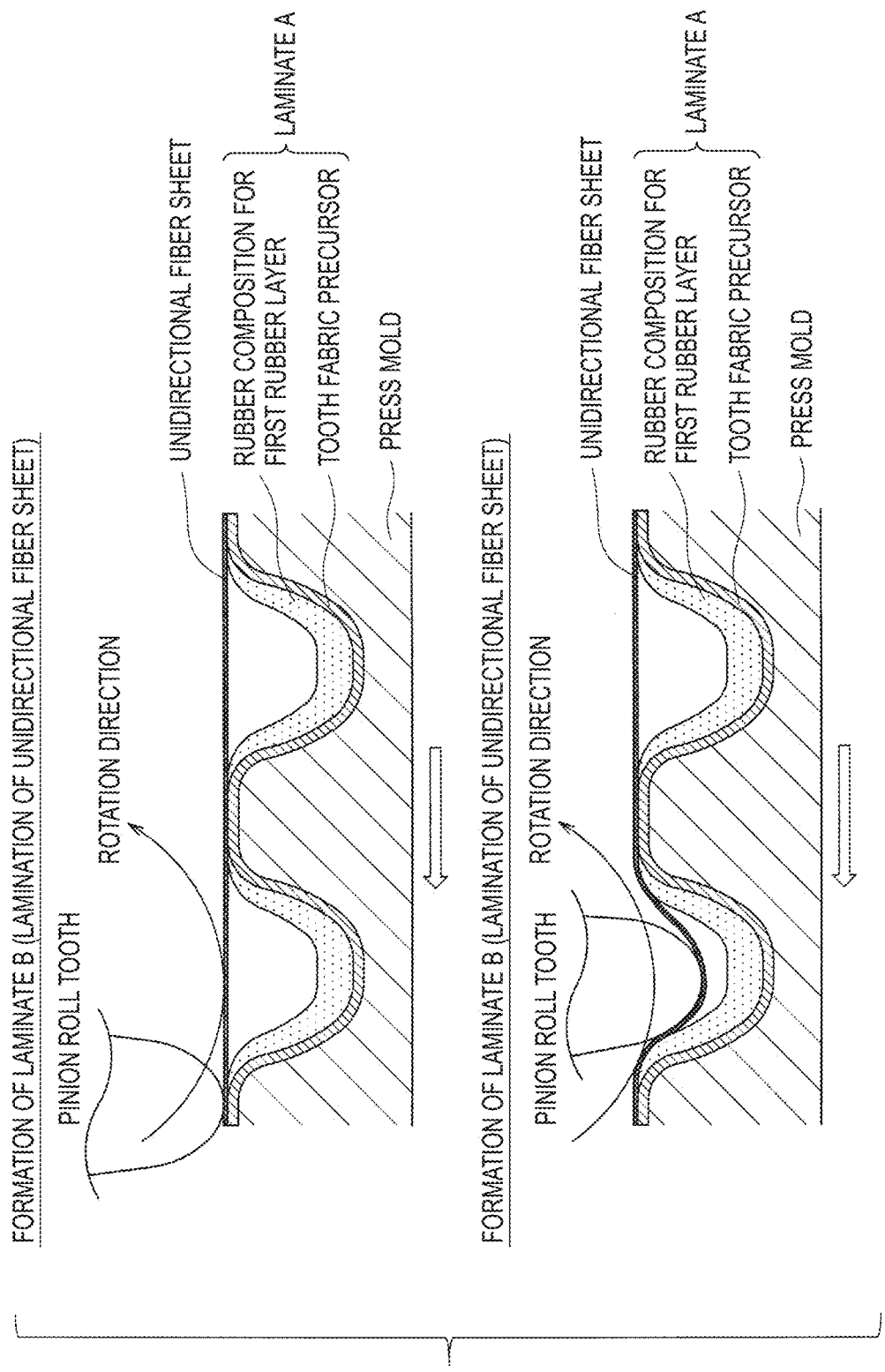
FIG. 6 is an explanatory view of a preforming step according to a method for manufacturing a toothed belt.
Figure 7:
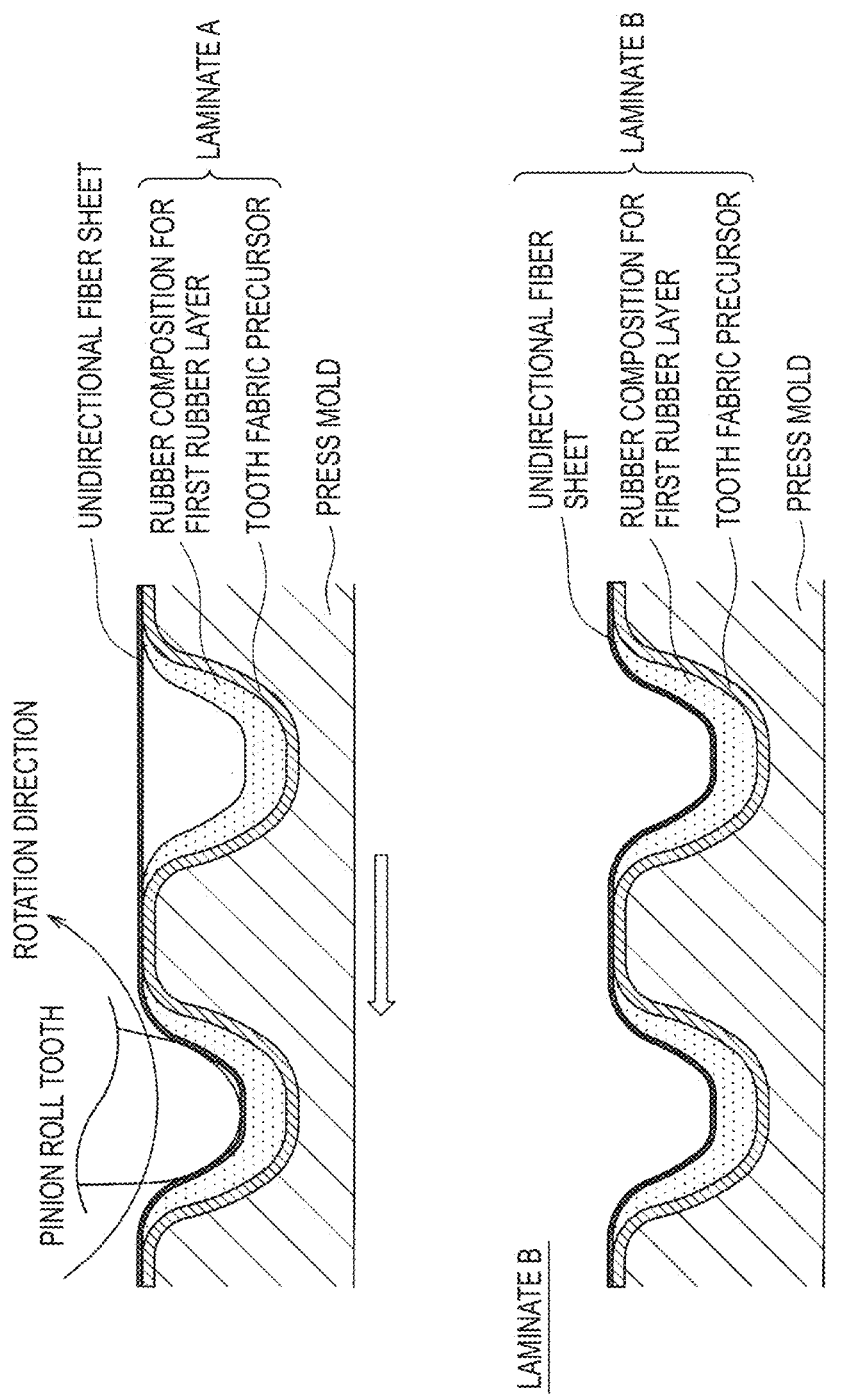
FIG. 7 is an explanatory view of a preforming step according to a method for manufacturing a toothed belt.

Next, as shown in FIG. 6, the unidirectional fiber sheet for forming the reinforcing layer 5 is arranged on an upper surface of the laminate A having the predetermined shape so that fiber filaments are arranged in the belt circumferential direction. As shown in FIG. 6 and FIG. 7, a laminate B is obtained by molding the unidirectional fiber sheet so as to follow the shape of the laminate A. The method of molding is not particularly limited, and examples thereof may include a method of pressing the grooves lined up in the press mold (flat mold) in order one by one using a pinion roll to form a shape (disclosed in JP2001-263432A, JP2005-41165A, and the like).

The unidirectional fiber sheet is easy to handle in the preforming step because the reinforcing fiber filaments 51 are bonded in a sheet shape and are not separated.

Figure 8:
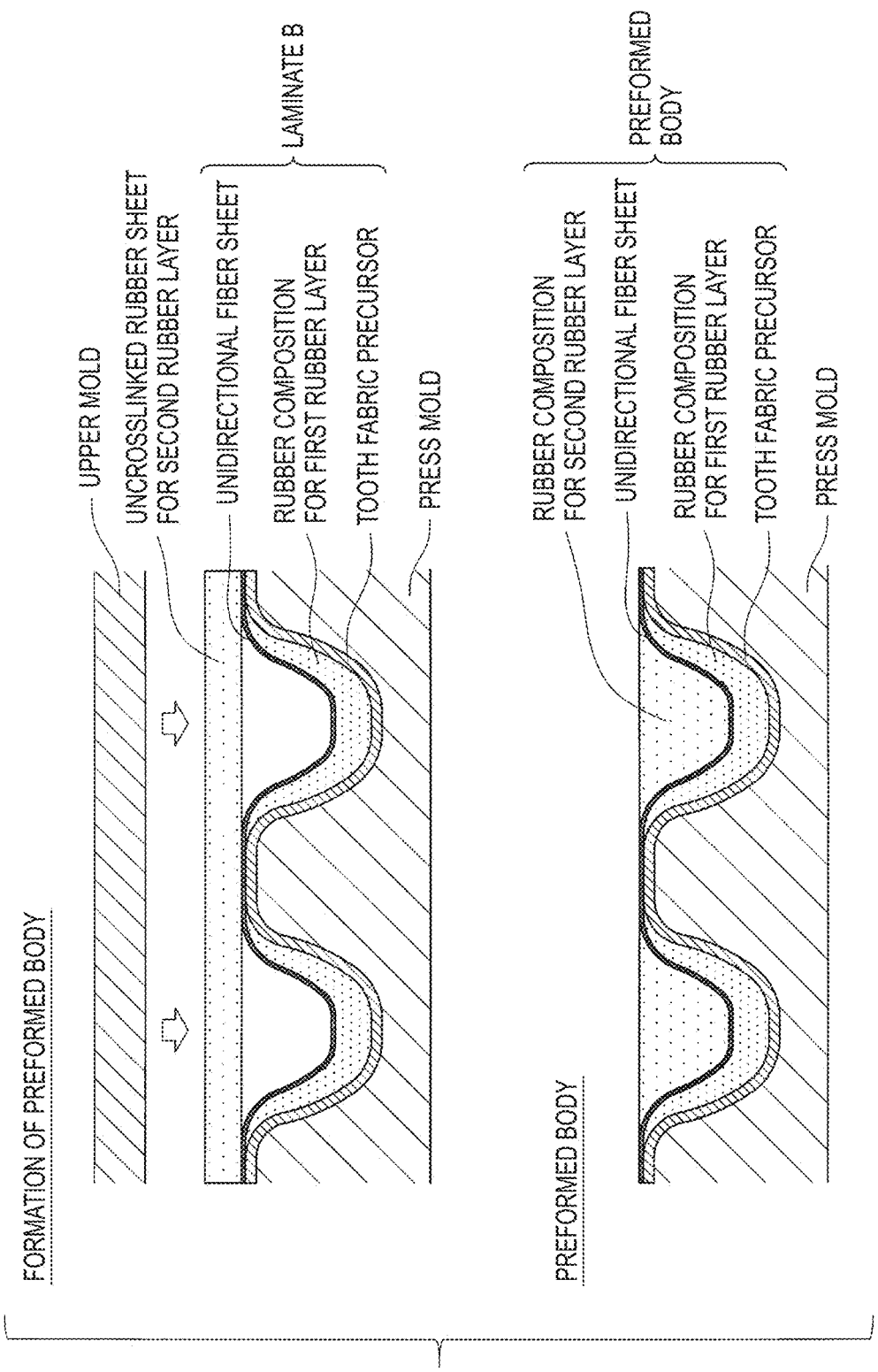
FIG. 8 is an explanatory view of a preforming step according to a method for manufacturing the toothed belt.

Next, as shown in FIG. 8, the uncrosslinked rubber sheet for forming the second rubber layer 34 is arranged on an upper surface of the laminate B having the predetermined shape, and the uncrosslinked rubber sheet for forming the second rubber layer 34 is pressurized by an upper mold and is press-fitted into the grooves while being heated to a temperature (for example, about 70° C. to 90° C.) at which the rubber composition is softened, thereby forming the tooth portion 3 and obtaining a preformed body in a semi-crosslinked state. In the process of forming the tooth portion 3 by press-fitting, the tooth fabric 6 is stretched along the contour of the tooth portion 3 and disposed on the outermost surface, and a layer structure is formed in which the first rubber layer 33, the reinforcing layer 5 (unidirectional fiber sheet), and the second rubber layer 34 are arranged in this order toward the inner side from the tooth fabric 6. After the preformed body is removed from the press mold, the preformed body is wound around a cylindrical mold having a plurality of grooves (concave shape) corresponding to the tooth portions 3 and attached (the tooth portions 3 and the grooves are fitted), and the processing proceeds to the next step.

(Crosslinking Molding Step)

The twisted cord constituting the core wires 4 is spirally wound around an outer circumferential surface of the obtained preformed body at a predetermined pitch (at a predetermined pitch in an axial direction of the cylindrical mold). Further, the uncrosslinked rubber sheet for forming the back rubber layer 21 is wound around the outer circumferential side of the twisted cord to form an uncrosslinked belt molded body (uncrosslinked laminate).

Subsequently, in a state in which the uncrosslinked belt molded body is arranged on an outer periphery of the cylindrical mold, a rubber jacket which is a vapor blocking material is further covered on the outside of the uncrosslinked belt molded body. Subsequently, the belt molded body covered with the jacket and the cylindrical mold are accommodated in a crosslinking molding device such as a vulcanization can. When the belt molded body is heated and pressurized inside the crosslinking molding device, a desired shape is formed, and respective constituent members are bonded and integrally cured by a crosslinking reaction of the uncrosslinked and semi-crosslinked rubber components contained in the belt molded body to form a sleeve-shaped crosslinked molded body (crosslinked belt sleeve).

(Cutting Step)

Finally, the crosslinked belt sleeve removed from the cylindrical mold is cut to a predetermined width, thereby obtaining a plurality of toothed belts 1.

EXAMPLES (Analysis by Two-Dimensional Finite Element Method (FEM))

In Examples 1 to 5, Comparative Examples 1 to 2, and Reference Examples 1 to 2, a two-dimensional model simulating a tooth shear test was created using a toothed belt having a total thickness (t) of 5.6 mm, a tooth height H1 (including a tooth fabric) of 3.5 mm, a tooth pitch (P) of 8 mm, and a tooth type of G8M, and when a load was applied to a contact surface between a tooth portion of the toothed belt and a toothed pulley, a stress generated at a tooth root was comparatively verified by a finite element analysis.

Figure 9:
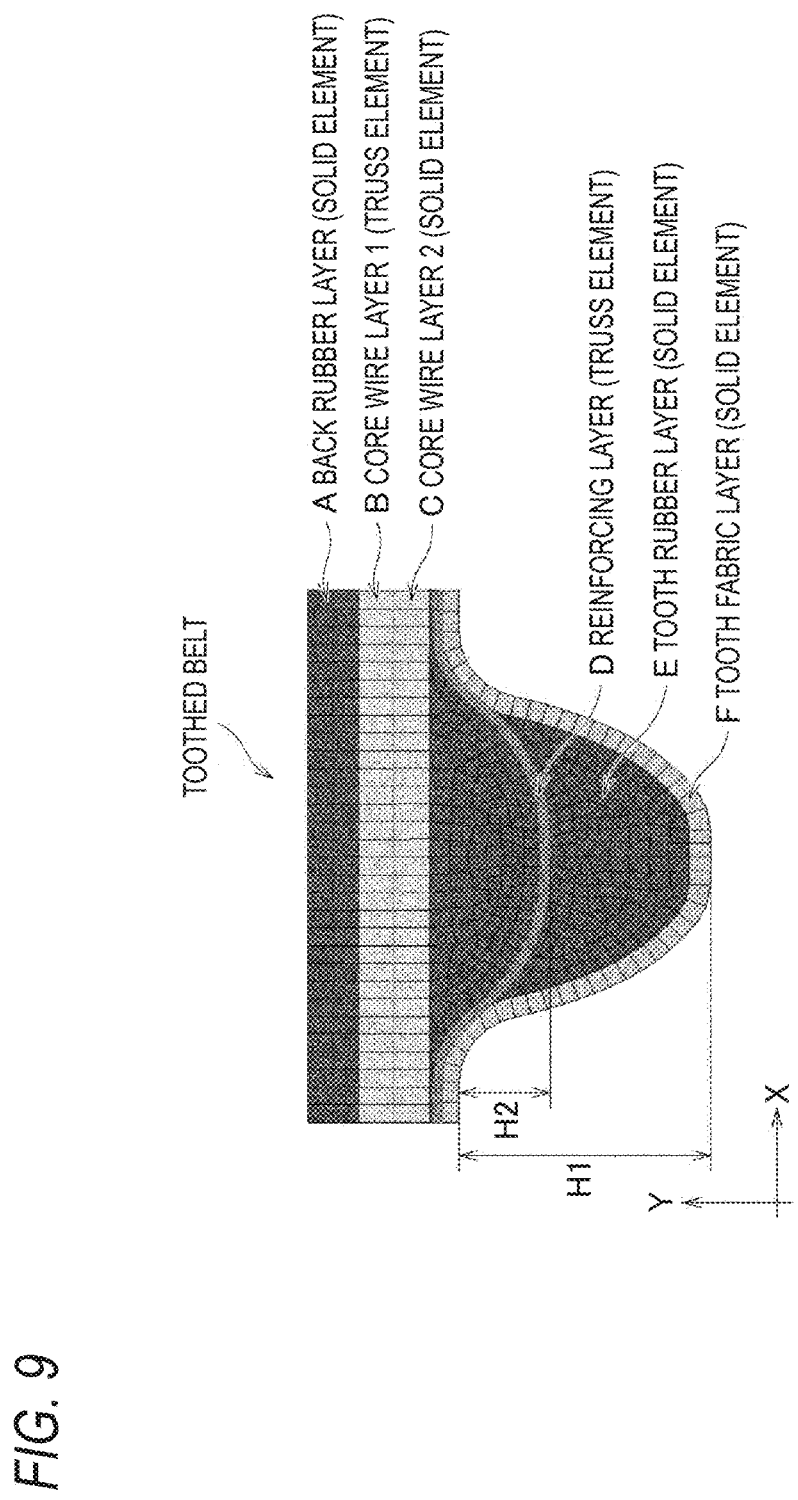
FIG. 9 is an explanatory view of a two-dimensional finite element analysis model of toothed belts according to examples and comparative examples.

As shown in FIG. 9, the two-dimensional finite element analysis model of the toothed belt has a rubber portion corresponding to a back rubber layer (A) and a tooth rubber layer (E), a core wire layer 1 (B) and a core wire layer 2 (C) corresponding to the core wire, a reinforcing layer D made of a unidirectional fiber sheet, and a tooth fabric layer F. The first rubber layer and the second rubber layer are collectively referred to as a tooth rubber layer (E).

Figure 10A:
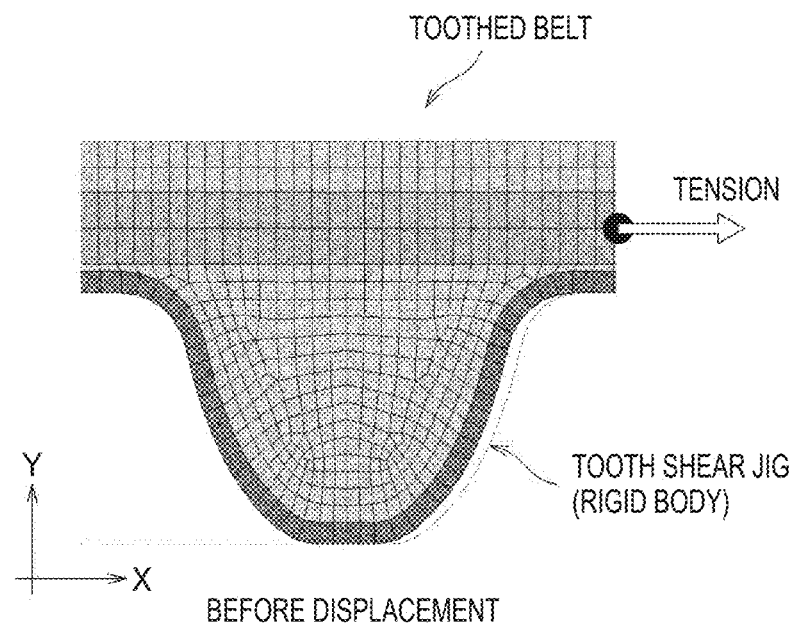
FIGS. 10A and 10B are explanatory views of a tooth shearing test of toothed belts according to examples and comparative examples.
Figure 10B:
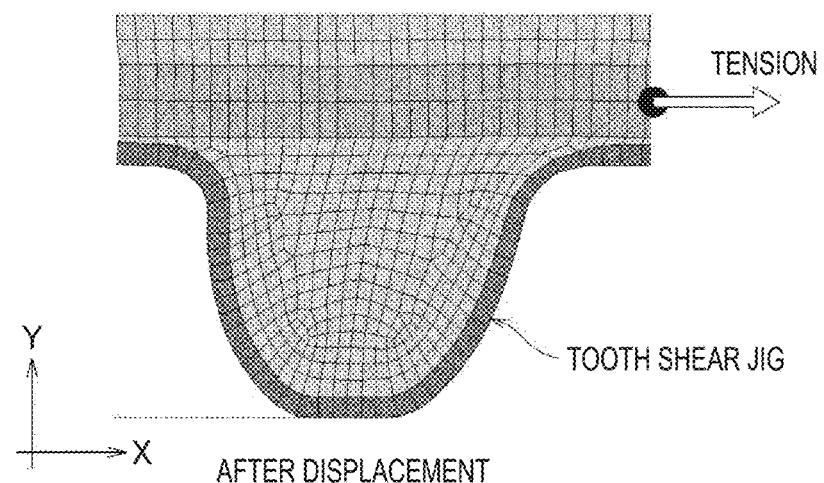
Figure 11A:
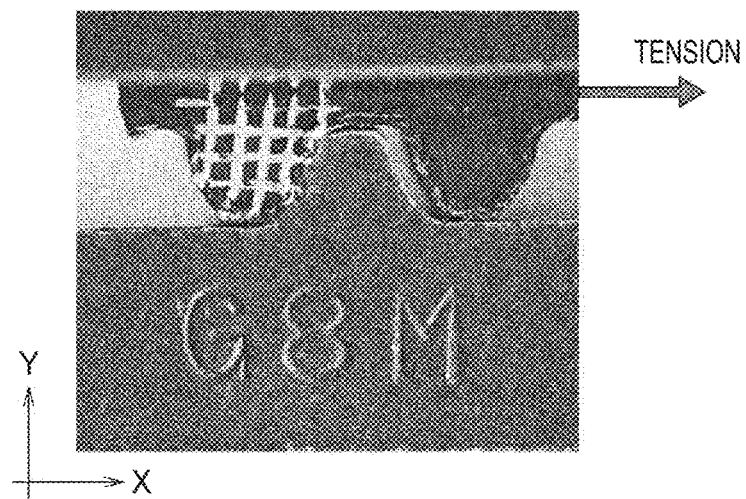
FIGS. 11A and 11B are explanatory views of a tooth shearing test of toothed belts according to examples and comparative examples.
Figure 11B:
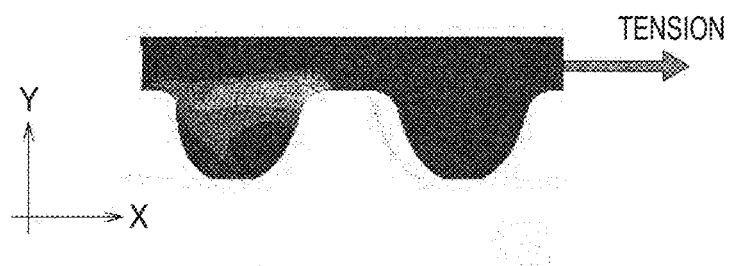

This model models one tooth of the toothed belt, and a back surface of the belt in a Y direction is constrained in-plane (see FIGS. 10A and 10B).

In the model of the core wire layer, truss elements (core wire layer 1) were arranged on a neutral plane in the belt thickness direction, and the periphery thereof was constituted with solid elements (core wire layer 2).

As a method of applying a load to the contact surface between the tooth portion of the toothed belt and the toothed pulley in the analysis, a tooth shear test was used as a model. Specifically, as shown in FIG. 10A, FIG. 10B, FIG. 11A, and FIG. 11B, the back surface of the belt was fixed within the plane in the Y direction, the tooth portion of the toothed belt was hooked on a tooth shear jig (rigid body assuming a tooth shape of the toothed pulley), and a central portion of the core wire was pulled and displaced.

As physical property values used for the analysis, material characteristics (C10, C01) of Mooney-Rivlin, which is a superelastic material model, were set for the solid elements, the rubber portion (back rubber layer (A) and tooth rubber layer (E)) was set to C10=5.0 MPa and C01=1.25 MPa, and the tooth fabric layer F was set to C10=10 MPa and C01=1.2 MPa.

The truss element portion of the core wire layer 1 (B) is a linear material model and was set to Young's modulus=27000 MPa and Poisson's ratio=0.4, and the solid element portion of the core wire layer 2 (C) is a linear material model and was set to Young's modulus=2000 MPa and Poisson's ratio=0.4.

The reinforcing layer D is a linear material model, the Young's modulus was varied, and the Poisson's ratio was set to 0.4.

The thickness of the reinforcing layer D was set to 0.1 mm.

The arrangement of the reinforcing layer D was varied on the model.

The finite element analysis was performed using the above model, and the displacement force (reaction force) against the displacement was defined as the rigidity of the tooth portion (hereinafter, tooth rigidity) and evaluated. Further, the stress generated at the tooth root was evaluated by Mises stress.

Evaluation Criteria of Pass-Fail of Finite Element Analysis Result

A two-dimensional finite element model was created to analyze various toothed belts verified in the following examples and comparative examples, and a maximum value X of the tooth rigidity and a maximum value Y of the Mises stress generated at the tooth root were calculated. A larger maximum value X of the tooth rigidity is superior, and a smaller maximum value Y of the Mises stress is superior. The superiority or inferiority was evaluated based on the following criteria.

Evaluation Criteria of Maximum Value X of Tooth Rigidity

A: 100 N/mm or more
B: 62 N/mm or more and less than 100 N/mm
C: less than 62 N/mm Evaluation Criteria of Maximum Value Y of Mises Stress A: less than 15.0 MPa
B: 15.0 MPa or more and less than 22.0 MPa
C: 22.0 MPa or more Verification Results of Finite Element Analysis Regarding the toothed belts of examples and comparative examples that were comparatively verified, the specification of each belt, the maximum value X of the tooth rigidity calculated by the finite element analysis, and the maximum value Y of the Mises stress generated at the tooth root are shown together with a comprehensive evaluation result in FIG. 12 and FIG. 14. In FIG. 12 and FIG. 14, for the specification of each belt, a position of the reinforcing layer in the tooth portion was indicated by a ratio [H2/H1×100 (%)] of the position H2 of the reinforcing layer to the tooth height H1 (see FIG. 9). Further, the unidirectional fiber elastic modulus (GPa), the maximum value X (N/mm) of the tooth rigidity, a distribution diagram of the Mises stress generated at the tooth root, and the maximum value Y (MPa) of the Mises stress generated at the tooth root were shown. The unidirectional fiber elastic modulus means the tensile modulus of each of the reinforcing fiber filaments constituting the unidirectional fiber sheet (reinforcing layer).

Figure 13A:
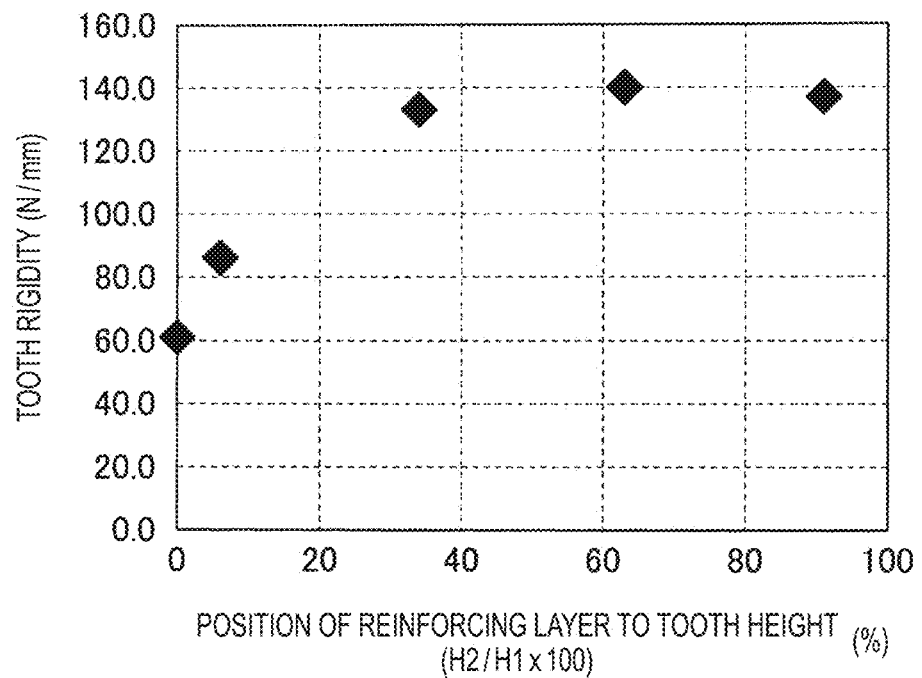
FIG. 13A is a graph showing a relationship between H2/H1 and tooth rigidity in FIG. 12.
Figure 13B:
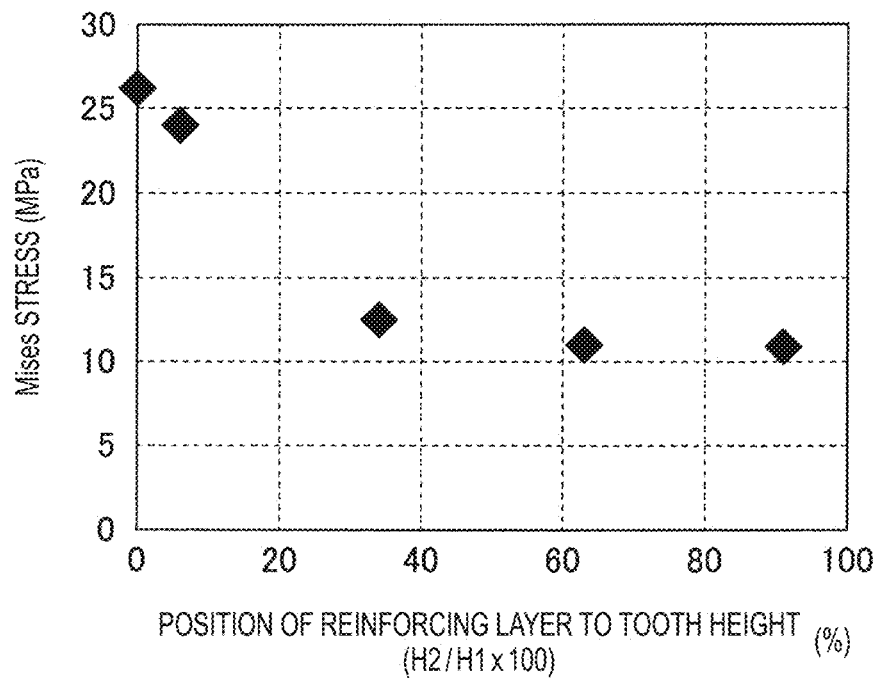
FIG. 13B is a graph showing a relationship between the H2/H1 and Mises stress in FIG. 12.
Figure 15A:
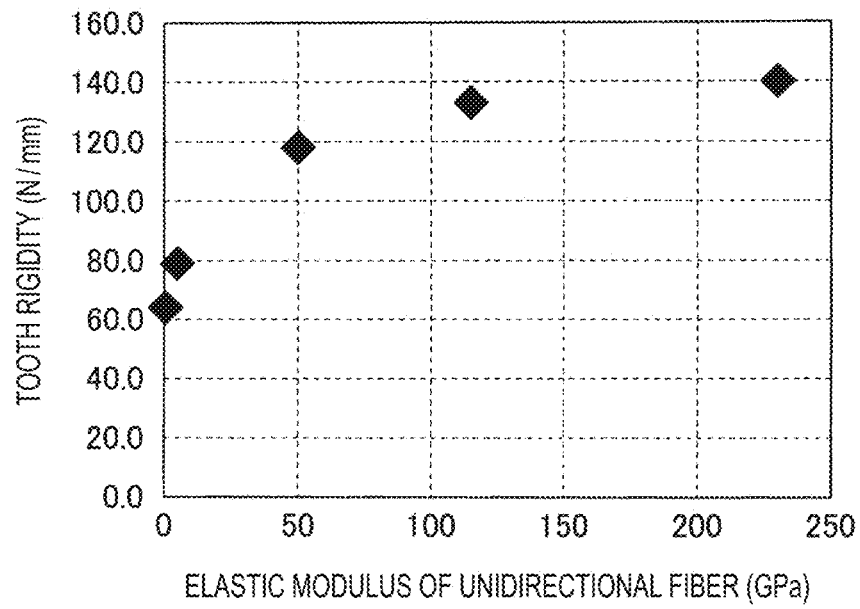
FIG. 15A is a graph showing a relationship between a unidirectional fiber elastic modulus and tooth rigidity in FIG. 14.
Figure 15B:
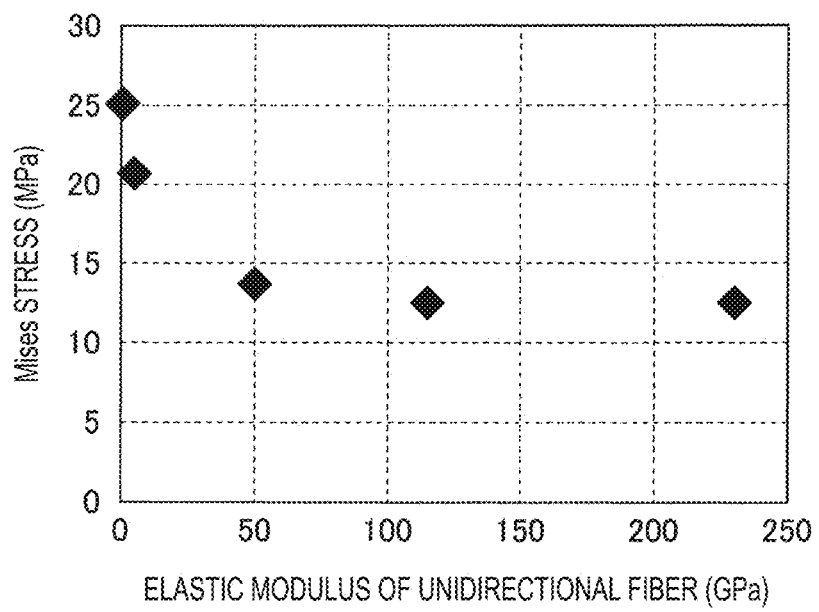
FIG. 15B is a graph showing a relationship between the unidirectional fiber elastic modulus and Mises stress in FIG. 14.

In FIG. 13A, a relationship between the ratio [H2/H1× 100(%)] of the position H2 of the reinforcing layer to the tooth height H1 and the tooth rigidity in FIG. 12 is graphed. In FIG. 13B, a relationship between the ratio [H2/H1×100 (%)] of the position H2 of the reinforcing layer to the tooth height H1 and the Mises stress in FIG. 12 is graphed. In FIG. 15A, a relationship between the unidirectional fiber elastic modulus and the tooth rigidity in FIG. 14 is graphed. In FIG. 15B, a relationship between the unidirectional fiber elastic modulus and the Mises stress in FIG. 14 is graphed.

Comprehensive Evaluation

In the comprehensive evaluation shown in FIG. 12 (and FIGS. 13A and 13B) and FIG. 14 (and FIGS. 15A and 15B), the ranks were classified into rank A to rank C based on the following criteria.
Rank A: a case where both X and Y are evaluated as A
Rank B: a case where one or both of X and Y are evaluated as B (not evaluated as C)
Rank C: a case where either X or Y is evaluated as C Examples 1 to 3 and Comparative Examples 1 to 2: FIGS. 12, 13A and 13B In Examples 1 to 3 and Comparative Examples 1 to 2, in a toothed belt having a tooth pitch of 8.0 mm and a tooth type of G8M, when a unidirectional fiber sheet having the unidirectional fiber elastic modulus of 115 GPa was used as the reinforcing layer and the position H2 of the reinforcing layer with respect to the tooth height H1 was changed, an analysis result and a comprehensive evaluation result of the maximum value X (N/mm) of the tooth rigidity and the maximum value Y (MPa) of the Mises stress generated at the tooth root were shown in FIG. 12, FIG. 13A and FIG. 13B.

In the case where the reinforcing layer was not buried (that is, the ratio H2/H1 of the position H2 of the reinforcing layer to the tooth height H1 was 0%) (Comparative Example 1), the maximum value X of the tooth rigidity was as small as 61 N/mm, and the maximum value Y of the Mises stress generated at the tooth root was as large as 26.2 MPa. Both were evaluated as C, and thus the comprehensive evaluation was rank C.

On the other hand, in the case where the reinforcing layer was buried along the shape (approximate contour) of the tooth, the maximum value X of the tooth rigidity increased and the maximum value Y of the Mises stress generated at the tooth root decreased as follows.

For example, in a toothed belt (Comparative Example 2) in which the ratio H2/H1 of the position H2 of the reinforcing layer to the tooth height H1 was 6% (0.2/3.5≈0.06), the evaluation of the tooth rigidity was improved to B evaluation at the maximum value X=86 N/mm, but the Mises stress generated at the tooth root was still large (evaluated as C) at the maximum value Y=24.0 MPa, and the comprehensive evaluation remained as rank C.

In a toothed belt (Example 1) in which the ratio H2/H1 of the position H2 of the reinforcing layer to the tooth height H1 was 34% (1.2/3.5≈0.34), the maximum value X of the tooth rigidity was 133 N/mm, and the maximum value Y of the Mises stress generated at the tooth root was 12.5 MPa. Both were evaluated as A, and thus the comprehensive evaluation was rank A.

In a toothed belt (Example 2) in which the ratio H2/H1 of the position H2 of the reinforcing layer to the tooth height H1 was 63% (2.2/3.5≈0.63), the maximum value X of the tooth rigidity was 140 N/mm, and the maximum value Y of the Mises stress generated at the tooth root was 11.0 MPa. Both were evaluated as A, and thus the comprehensive evaluation was rank A.

In a toothed belt (Example 3) in which the ratio H2/H1 of the position H2 of the reinforcing layer to the tooth height H1 was 91% (3.2/3.5≈0.91), the maximum value X of the tooth rigidity was 137 N/mm, and the maximum value Y of the Mises stress generated at the tooth root was 10.9 MPa. Both were evaluated as A, and thus the comprehensive evaluation was rank A.

From the above results, as the ratio H2/H1 of the position H2 of the reinforcing layer to the tooth height H1 increases, the maximum value X of the tooth rigidity increases and the maximum value Y of the Mises stress generated at the tooth root decreases, but the toothed belt in which H2/H1 is 34% or more is evaluated as rank A, and there is no significant change when H2/H1 is 34% or more.

Example 1, Examples 4 to 5, Reference Examples 1 to 2: FIGS. 14, 15A and 15B

FIG. 14, FIG. 15A and FIG. 15B show analysis results of the maximum value X of the tooth rigidity and the maximum value Y of the Mises stress generated at the tooth root when the unidirectional fiber elastic modulus was changed while keeping H2/H1 constant at 34% on the basis of the toothed belt (the unidirectional fiber elastic modulus was 115 GPa, and the ratio H2/H1 of the position H2 of the reinforcing layer to the tooth height H1 was 34%) of Example 1.

In a toothed belt having a unidirectional fiber elastic modulus of 0.5 GPa (Reference Example 1), the tooth rigidity was as small as the maximum value X=64 N/mm (evaluated as B), the Mises stress generated at the tooth root was as large as the maximum value Y=25.1 MPa (evaluated as C), and thus the comprehensive evaluation was rank C.

In a toothed belt having a unidirectional fiber elastic modulus of 5 GPa (Reference Example 2), the maximum value X of the tooth rigidity was 79 N/mm, and the maximum value Y of the Mises stress generated at the tooth root was 20.7 MPa. Both were evaluated as B, and thus the comprehensive evaluation was rank B.

In a toothed belt having a unidirectional fiber elastic modulus of 50 GPa (Example 4), the maximum value X of the tooth rigidity was 118 N/mm, and the maximum value Y of the Mises stress generated at the tooth root was 13.7 MPa. Both were evaluated as A, and thus the comprehensive evaluation was rank A.

In a toothed belt (230 GPa: Example 5) having a larger unidirectional fiber elastic modulus than that of Example 1, the maximum value X of the tooth rigidity was 140 N/mm, and the maximum value Y of the Mises stress generated at the tooth root was 12.5 MPa. Both were evaluated as A, and thus the comprehensive evaluation was rank A.

From the above results, as the unidirectional fiber elastic modulus increases, the maximum value X of the tooth rigidity increases and the maximum value Y of the Mises stress generated at the tooth root decreases, but the toothed belt having the unidirectional fiber elastic modulus of 50 GPa or more is evaluated as rank A, and no significant change occurs at 115 GPa or more.

Evaluation of Tooth Rigidity of Toothed Belt

In Examples A to M and Comparative Examples A to G, a test piece (width: 20 mm, length: 196 mm) was sampled from each toothed belt produced based on materials and configurations shown in Tables 1 to 8 below, a tooth rigidity test was performed, and the tooth rigidity of each toothed belt was comparatively evaluated.

TABLE 1

| [Rubber Composition (parts by mass)] | | |
|---|---|---|
| | Tooth portion Rubber composition A | Back portion Rubber composition B |
| HNBR | — | 80 |
| HNBR containing unsaturated carboxylic acid metal salt | 100 | 20 |
| Aramid short fiber | 2 | — |
| Stearate | 1 | 1 |
| Carbon black SRF | 2 | 2 |
| Silica | — | 40 |
| Calcium carbonate | 20 | — |
| Zinc oxide | 5 | 2 |
| Age resister | 2 | 2 |
| Organic peroxide | 2 | 2 |
| Co-crosslinking agent | 1 | 2 |
| Plasticizer | — | 10 |
| Total | 135 | 161 |

[Materials Used for Rubber Composition]

HNBR: "Zetpol 2010" manufactured by Zeon Corporation, iodine value: 11 mg/100 mg HNBR containing an unsaturated carboxylic acid metal salt: "Zeoforte ZSC2295CX" manufactured by Zeon Corporation;

Base HNBR: unsaturated carboxylic acid metal salt (mass ratio)=100; 110, iodine value of 28 mg/100 mg of base HNBR;

Aramid short fiber: "Conex" manufactured by Teijin Limited, average fiber length of 3 mm, average fiber diameter of 14 μm Stearate: "Tsubaki Stearate" manufactured by NOF Corporation Carbon Black SRF: "Seast S" manufactured by Tokai Carbon Co., Ltd., average particle diameter of 66 nm, iodine adsorption amount of 26 mg/g Silica: "Ultrasil VN-3" manufactured by Evonik Degussa Japan Co., Ltd., specific surface area of 155 $m^2$/g to 195 $m^2$/g Calcium Carbonate: "Super #1500" manufactured by Maruo Calcium Co., Ltd, average particle diameter of 1.5 μm Zinc Oxide: "Zinc oxide (type II)" manufactured by Sakai Chemical Industry Co., Ltd., average particle diameter of 0.55 μm Age Resister: p,p'-Dioctyldiphenylamine, "Nonflex OD3" manufactured by Seiko Chemical Co., Ltd.

Organic Peroxide: 1,3-bis(t-butylperoxyisopropyl)benzene, theoretical active oxygen content 9.45%

Co-Crosslinking Agent: N,N'-m-phenylene dimaleimide, Ouchi Shinko Chemical Industrial Co., Ltd., "Vulnoc PM"

Plasticizer: "Adeka Cizer RS 700" manufactured by ADEKA Corporation

[Reinforcing Layer]

Unidirectional fiber sheet 1: Carbon fiber filaments "Torayca T700S" (tensile modulus: 230 GPa, filament diameter: 7 μm, density: 1.80 g/$cm^3$) manufactured by Toray Industries, Inc. were bonded with an epoxy resin to prepare a sheet with three thickness levels of 0.05 mm (weight per unit area: 60 g/$m^2$), 0.10 mm (weight per unit area: 120 g/$m^2$), and 0.20 mm (weight per unit area: 240 g/$m^2$).

Unidirectional fiber sheet 2: Carbon fiber filaments "Tenax IMS60" (tensile modulus: 290 GPa, filament diameter: 6 μm, density: 1.73 g/$cm^3$) manufactured by Teijin Limited were bonded with an epoxy resin to prepare a sheet having a thickness of 0.10 mm (weight per unit area: 120 g/$m^2$).

Unidirectional fiber sheet 3: Aramid fiber filaments "Kevlar 49" (tensile modulus; 112 GPa, filament diameter: 12 μm, density: 1.45 g/$cm^3$) manufactured by Toray Industries, Inc. were bonded with an epoxy resin to prepare a sheet with three thickness levels of 0.05 mm (weight per unit area: 50 g/$m^2$), 0.10 mm (weight per unit area: 100 g/$m^2$), and 0.20 mm (weight per unit area: 200 g/$m^2$).

Unidirectional fiber sheet 4: Aramid fiber filaments "Kevlar 119" (tensile modulus; 54.7 GPa filament diameter: 12 μm, density: 1.44 g/$cm^3$) manufactured by Toray Industries, Inc. were bonded with an epoxy resin to prepare a sheet with three thickness levels of 0.05 mm (weight per unit area: 50 g/$m^2$), 0.10 mm (weight per unit area: 100 g/$m^2$), and 0.20 mm (weight per unit area: 200 g/$m^2$).

Blinds-like sheet 1: A sheet (commonly known as blinds-like cords) in which twisted cords (1670 dtex/1×2) of aramid fibers oriented in one direction are connected with fine yarns of cotton (count: 20S/1). The density of twisted cords was 50 yarns/5 cm, the density of fine yarns was 4 yarns/5 cm, and the thickness of the sheet was 0.7 mm.

Blinds-like sheet 2: A sheet (commonly known as blinds-like cords) in which twisted cords (1100 dtex/1×2) of PET fibers oriented in one direction are connected with fine yarns of cotton (count: 20S/1). The density of twisted cords was 50 yarns/5 cm, the density of fine yarns was 4 yarns/5 cm, and the thickness of the sheet was 0.6 mm.

[Core Wire]

A carbon fiber cord (12K-1/0, tensile modulus: 230 GPa) obtained by single-twisting one 12K multifilament yarn ["Torayca T700SC-12000" manufactured by Toray Industries, Inc., single yarn fineness: 0.67 dtex, total fineness: 800 tex] was prepared and subjected to an adhesion treatment with an HNBR overcoat treatment agent to obtain a core wire having a core wire diameter of 1.1 mm.

[Tooth Fabric and Treatment of Tooth Fabric]

A woven fabric shown in Table 2 was immersed in an RFL treatment liquid and rubber cement to prepare a tooth fabric precursor. Specifically, in the RFL treatment, two types of RFL treatment liquids (RFL1 and RFL2) shown in Table 3 were used, and the immersion treatment was performed in the order of RFL1 and RFL2. Further, in the rubber cement treatment, two types of rubber cement (rubber cement 1 and rubber cement 2) shown in Table 4 were used, and the immersion treatment was performed in order of the rubber cement 1 and the rubber cement 2.

TABLE 2

(Woven Fabric Structure)
Tooth fabric structure

| | |
|---|---|
| Weave structure | Weft: two-color double weave |
| | Front: 1/3 twill weave; Back: 2/2 twill weave |
| Warp | Nylon 66 |
| Weft-1 | PTFE fiber *1 |
| | Polyester fiber *2 |
| | Urethane elastic yarn |
| Weft-2 | Nylon 66 |
| | Urethane elastic yarn |

*1 PTFE fiber ["Toyoflon 1330 dtex" manufactured by Toray Industries, Inc.]
*2 Polyester fiber ["Cornetta", core-sheath type composite fiber with core melting point of 256° C. and sheath melting point of 160° C., manufactured by Unitika Ltd.]

TABLE 3

(RFL Composition (parts by mass))

| Composition | RFL1 | RFL2 |
|---|---|---|
| Hydrogenated nitrile rubber latex (40 mass %) | 100 | 100 |
| RF condensate dispersion (20 mass %) | 50 | 25 |
| NaOH aqueous solution (10 mass %) | 0 | 2 |
| Maleimide compound aqueous dispersion (50 mass %) | 0 | 20 |
| Water | 110 | 110 |

TABLE 4

(Rubber Cement Composition (parts by mass))

| Composition | Rubber cement 1 | Rubber cement 2 |
|---|---|---|
| Composition for hydrogenated nitrile rubber cement rubber | 5 | 15 |
| Polymeric MDI | 5 | 0 |
| Methyl ethyl ketone | 90 | 85 |

[Preparation of Uncrosslinked Rubber Sheet]

An uncrosslinked rubber sheet for forming the tooth portion (first rubber layer and second rubber layer) and the back portion (back rubber layer) was prepared by kneading each rubber composition having the composition shown in Table 1 using a Banbury mixer, and rolling the obtained kneaded rubber to a predetermined thickness using a calendar roll. The aramid short fibers contained in the uncrosslinked rubber sheet were oriented in a rolling direction.

[Production of Toothed Belt]

In Examples A to M and Comparative Examples A to G, as described below, a toothed belt having a total thickness of 9.0 mm, a tooth type of S14M, a tooth height (including a tooth fabric) of 5.3 mm, a tooth pitch of 14 mm, the number of teeth of 80, a circumferential length of 1120 mm, and a width of 20 mm was produced using the preforming method described in the embodiment.

Regarding the toothed belts produced in the respective examples, comparative examples, and reference examples, the configuration of the tooth portion (configuration of the reinforcing layer) and the measurement result of the tooth rigidity are shown in Tables 5 to 8.

TABLE 5

| | | | Comp. Ex. A | Comp. Ex. B | Comp. Ex. C | Ex. A | Ex. B | Ex. C | Ex. D | Ex. E | Ex. F | Ex. G |
|---|---|---|---|---|---|---|---|---|---|---|---|---|
| Configuration of reinforcing layer | Unidirectional fiber sheet | Fiber type | None | | | Unidirectional fiber sheet 1 Carbon fiber | | | | | | Unidirectional fiber sheet 2 Carbon fiber |
| | | Twist | | | | | | | No twist | | | |
| | | Unidirectional fiber elastic modulus M [GPa] | | | | 230 | | | 230 | | 230 | 290 |
| | | Weight per unit area [g/m$^2$] | | | | 120 | | | 60 | 240 | 60 | 120 |
| | | Bonding method | | | | | | | Bonded with thermosetting resin | | | |
| | Arrangement | Tooth height H1 [mm] | 5.3 | | | 5.3 | | | 5.3 | | 5.3 | 5.3 |
| | | Position H2 of reinforcing layer [mm] | 0 | 0.5 | 1.0 | 2.0 | 2.8 | 5.3 | 2.8 | | 5.3 | 2.8 |
| | | Ratio of position H2 of reinforcing layer to tooth height H2/H1 × 100 | — | 9% | 19% | 38% | 53% | 100% | 53% | | 100% | 53% |
| | | Number of laminated layers | 0 | | | 1 | | | 1 | | 1 | 1 |
| | | Thickness T of reinforcing layer [mm] | — | | | 0.10 | | | 0.05 | 0.20 | 0.05 | 0.10 |
| | | Index Z (=M × T) | — | | | 23 | | | 12 | 46 | 12 | 29 |
| Tooth rigidity (K value, relative value) | | | 1.00 | 1.20 | 1.43 | 1.92 | 2.05 | 1.76 | 1.76 | 2.03 | 1.72 | 2.10 |
| Evaluation (rank) | | | C | C | C | A | A | A | A | A | A | A |

TABLE 6

| | | | Ex. H | Ex. I | Ex. J | Ex. K |
|---|---|---|---|---|---|---|
| Configuration of reinforcing layer | Unidirectional fiber sheet | Fiber type | Unidirectional fiber sheet 3 Aramid fiber | | | |
| | | Twist | No twist | | | |
| | | Unidirectional fiber elastic modulus M [GPa] | 112 | | | |
| | | Weight per unit area [g/m²] | 100 | | 50 | 200 |
| | | Bonding method | Bonded with thermosetting resin | | | |
| | Arrangement | Tooth height H1 [mm] | 5.3 | | | |
| | | Position H2 of reinforcing layer [mm] | 2.8 | 5.3 | | 2.8 |
| | | Ratio of position H2 of reinforcing layer to tooth height H2/H1 × 100 | 53% | 100% | | 53% |
| | | Number of laminated layers | 1 | | | |
| | | Thickness T of reinforcing layer [mm] | 0.10 | | 0.05 | 0.20 |
| | | Index Z (=M × T) | 11 | | 5.6 | 22 |
| Tooth rigidity (K value: relative value) | | | 1.91 | 1.75 | 1.61 | 2.41 |
| Evaluation (rank) | | | A | A | B | A |

TABLE 7

| | | | Comp. Ex. D | Comp. Ex. E | Ex. L | Ex. M |
|---|---|---|---|---|---|---|
| Configuration of reinforcing layer | Unidirectional fiber sheet | Fiber type | Unidirectional fiber sheet 4 Aramid fiber | | | |
| | | Twist | No twist | | | |
| | | Unidirectional fiber elastic modulus M [GPa] | 54.7 | | | |
| | | Weight per unit area [g/m²] | 50 | | 100 | 200 |
| | | Bonding method | Bonded with thermosetting resin | | | |
| | Arrangement | Tooth height H1 [mm] | 5.3 | | | |
| | | Position H2 of reinforcing layer [mm] | 5.3 | | 2.8 | |
| | | Ratio of position H2 of reinforcing layer to tooth height H2/H1 × 100 | 100% | | 53% | |
| | | Number of laminated layers | 1 | | | |
| | | Thickness T of reinforcing layer [mm] | 0.05 | | 0.10 | 0.20 |
| | | Index Z (=M × T) | 2.7 | | 5.5 | 11 |
| Tooth rigidity (K value: relative value) | | | 1.19 | 1.32 | 1.60 | 1.95 |
| Evaluation (rank) | | | C | C | B | A |

TABLE 8

| | | | Comparative Example F | Comparative Example G |
|---|---|---|---|---|
| Configuration of reinforcing layer | Blinds-like sheet (Blinds-like cords) | Fiber type | Blinds-like sheet 1 Aramid fiber | Blinds-like sheet 2 PET fiber |
| | | Twist | Twisted | |
| | | Bonding method | Bonded with fine yarn | |

TABLE 8-continued

|  |  | Comparative Example F | Comparative Example G |
|---|---|---|---|
| Arrangement | Tooth height H1 [mm] | 5.3 | |
| | Position H2 of reinforcing layer [mm] | 2.8 | |
| | Ratio of position H2 of reinforcing layer to tooth height H2/H1 × 100 | 53% | |
| | Number of laminated layers | 1 | |
| | Thickness T of reinforcing layer [mm] | 0.7 | 0.6 |
| Tooth rigidity (K value: relative value) | | 1.45 | 0.95 |
| Evaluation (rank) | | C | C |

Comparative Examples B and C and Examples A to C

The tooth fabric precursor for forming the tooth fabric and the uncrosslinked rubber sheet (rubber composition A) for forming the first rubber layer were laminated in this order on a press mold (flat mold) having a plurality of grooves (concave shape) corresponding to tooth portions of a toothed belt, and pressurized under conditions of a temperature of 90° C. and a press pressure (surface pressure) of 20.2 MPa to form a semi-crosslinked laminate A. Next, the unidirectional fiber sheet (unidirectional fiber sheet 1; weight per unit area: 120 g/m², thickness: 0.10 mm) for forming the reinforcing layer 5 was molded to form a laminate B, and the uncrosslinked rubber sheet (rubber composition A) for forming the second rubber layer was further press-fitted to prepare a preformed body.

Next, the preformed body was wound around a cylindrical mold and attached (the tooth portions and the grooves are fitted), and twisted cords constituting the core wire was spirally spun on an outer circumferential surface of the preformed body (tension: 150 to 250 N/thread, spinning pitch: 1.25 mm, spinning speed: 1.5 m/s). Further, the uncrosslinked rubber sheet (rubber composition B) for forming the back rubber layer was wound around the outer circumferential side of the twisted cords to form an uncrosslinked belt molded body (uncrosslinked laminate).

Subsequently, crosslinking molding was performed for 40 minutes using a vulcanization can under conditions of a heating temperature of 179° C. and a vapor pressure of 0.83 MPa to prepare a crosslinked molded body (crosslinked belt sleeve).

Finally, the crosslinked belt sleeve removed from the cylindrical mold was cut to a width of 20 mm to obtain a toothed belt.

The reinforcing layer 5 was arranged such that an arrangement direction of the fiber filaments included in the unidirectional fiber sheet was the belt longitudinal direction, and the position H2 in the belt thickness direction in each example was the position described in Table 5.

Examples D and E

A toothed belt was produced in the same manner as in Example B, except that for the unidirectional fiber sheet 1 for forming the reinforcing layer 5, the weight per unit area was changed to 60 g/m² (thickness: 0.05 mm) in Example D, and the weight per unit area was changed to 240 g/m² (thickness: 0.20 mm) in Example E.

Example F

A toothed belt was produced in the same manner as in Example C, except that the weight per unit area of the unidirectional fiber sheet 1 for forming the reinforcing layer 5 was changed to 60 g/m² (thickness: 0.05 mm).

Example G

A toothed belt was produced in the same manner as in Example B, except that the unidirectional fiber sheet forming the reinforcing layer 5 was changed to the unidirectional fiber sheet 2 (weight per unit area: 120 g/m², thickness: 0.10 mm) having a different unidirectional fiber elastic modulus.

Examples H to K

In Example H, a toothed belt was produced in the same manner as in Example B, except that the unidirectional fiber sheet forming the reinforcing layer 5 was changed to the unidirectional fiber sheet 3 (weight per unit area: 100 g/m², thickness: 0.10 mm) having a different unidirectional fiber elastic modulus.

In Example I, a toothed belt was produced in the same manner as in Example H, except that the position H2 in the belt thickness direction where the reinforcing layer 5 was arranged was changed to 5.3 mm (H2/H1×100=100%).

A toothed belt was produced in the same manner as in Example H, except that for the unidirectional fiber sheet 3 for forming the reinforcing layer 5, the weight per unit area was changed to 50 g/m² (thickness: 0.05 mm) in Example J, and the weight per unit area was changed to 200 g/m² (thickness: 0.20 mm) in Example K.

Comparative Example E, Examples L and M

In Example L, a toothed belt was produced in the same manner as in Example B, except that the unidirectional fiber sheet forming the reinforcing layer 5 was changed to the unidirectional fiber sheet 4 (weight per unit area: 100 g/m², thickness: 0.10 mm) having a different unidirectional fiber elastic modulus.

A toothed belt was produced in the same manner as in Example L, except that for the unidirectional fiber sheet 4 for forming the reinforcing layer 5, the weight per unit area was changed to 50 g/m² (thickness: 0.05 mm) in Comparative Example E, and the weight per unit area was changed to 200 g/m² (thickness: 0.20 mm) in Example M.

Comparative Example D

A toothed belt was produced in the same manner as in Comparative Example E, except that the position H2 in the belt thickness direction where the reinforcing layer 5 was arranged was changed to 5.3 mm (H2/H1×100=100%).

Comparative Examples F and G

In Comparative Example F, a toothed belt was produced in the same manner as in Example B, except that the unidirectional fiber sheet for forming the reinforcing layer 5 was changed to the blinds-like sheet 1 (thickness: 0.70 mm).

In Comparative Example G, a toothed belt was produced in the same manner as in Example B, except that the unidirectional fiber sheet for forming the reinforcing layer 5 was changed to the blinds-like sheet 2 (thickness: 0.60 mm).

Comparative Example A

As an example in which no reinforcing layer was provided, a preformed body was produced by a method in which no unidirectional fiber sheet was used in the preforming method described in the embodiment. That is, the tooth fabric precursor for forming the tooth fabric and the uncrosslinked rubber sheet (rubber composition A, sheet thickness: 2.3 mm) for forming the tooth rubber layer (first rubber layer and second rubber layer) were laminated in this order on a press mold (flat mold) having a plurality of grooves (concave shape) corresponding to tooth portions of a toothed belt and press-fitted under conditions of a temperature of 90° C. and a press pressure (surface pressure) of 20.2 MPa to prepare a preformed body in a semi-crosslinked state.

In the subsequent steps, toothed belts were produced in the same manner as in other examples and comparative examples.

[Tooth Rigidity Test]

Figure 16A:
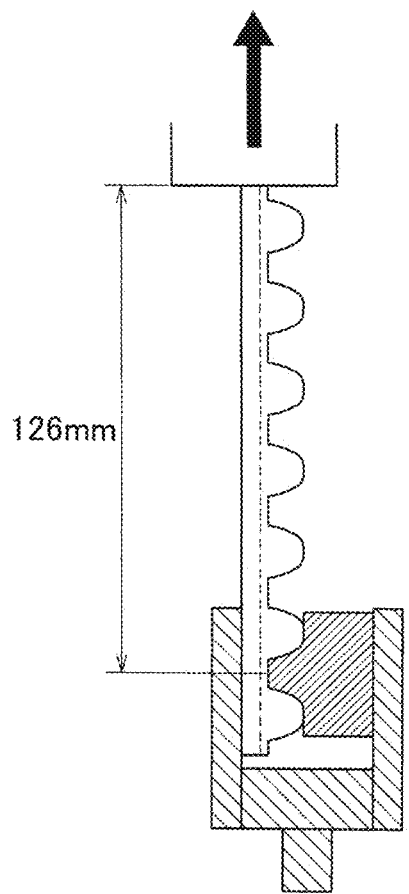
FIG. 16A and FIG. 16B are explanatory views of a tooth rigidity test according to examples.
Figure 16B:
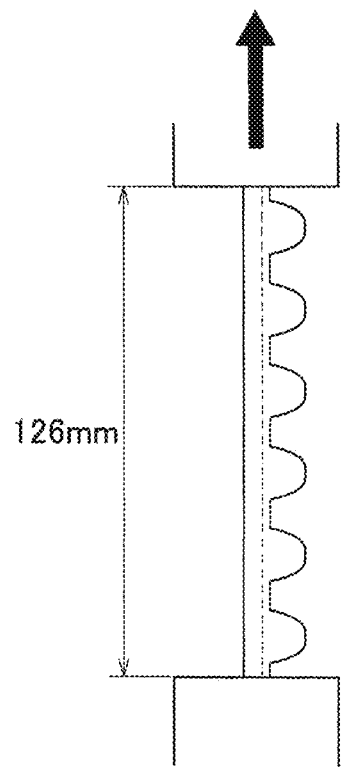
Figure 17:
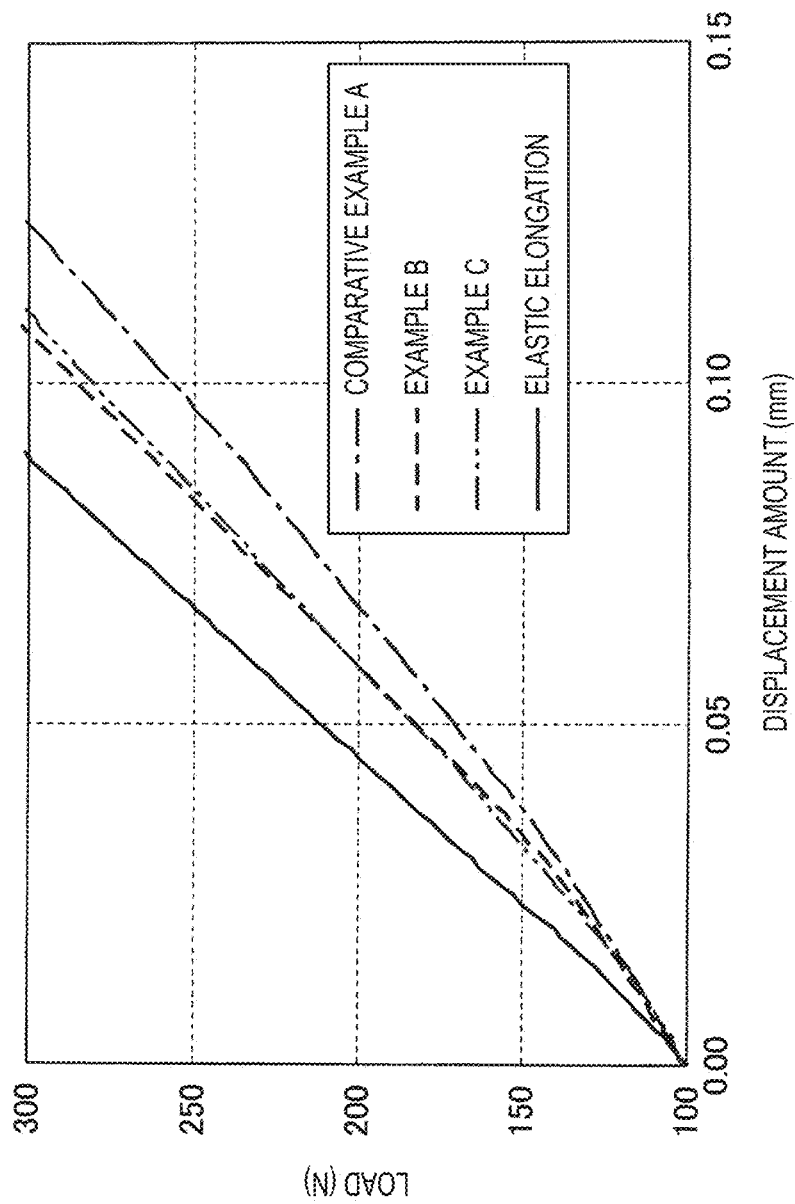
FIG. 17 is a graph of measured values of tooth rigidity showing results of the tooth rigidity test according to the examples.

A test piece (width: 20 mm, length: 196 mm) was sampled from the prepared toothed belt, and as shown in FIG. 16A, a tooth portion of the test piece was engaged with a protrusion of a tooth shear jig (rigid body assuming a tooth shape of the toothed pulley). In a state in which one tooth was pressed at a constant pressure (tightening torque: 0.98 cNm/1 mm width), a load with respect to a displacement amount when the tooth was pulled at a speed of 2 mm/min was measured with an autograph (graph of FIG. 17), and a slope K1 (N/mm) thereof was calculated. At this time, when both ends of the test piece were gripped by chucks (grippers), a gripping width was 126 mm. The K1 obtained by the method is a measured value including not only deformation of the tooth portion but also influence of displacement due to elastic elongation of the belt. Therefore, as shown in FIG. 16B, a slope K2 obtained by the same measurement by the method excluding a portion engaged with the tooth shear jig was regarded as a numerical value due to the influence of the elastic elongation of the belt. A value of K calculated from K1 and K2 according to the relationship of the following Formula 1 was used as an index indicating the rigidity (tooth rigidity) of the tooth portion.

In Tables 5 to 8, regarding the value of the index K of the tooth rigidity, the K value in Comparative Example A including no reinforcing layer (unidirectional fiber sheet) is set to 1.00, and K values in the respective examples and comparative examples are converted into relative values, and a larger value indicates that the rigidity (deformation resistance) of the tooth portion is improved owing to the effect of the reinforcing layer.

[Equation 1]

$$\frac{1}{K} = \frac{1}{K_1} - \frac{1}{K_2} \qquad \text{Formula 1}$$

Evaluation Criteria of Tooth Rigidity

Evaluation of the tooth rigidity of the toothed belt was classified into rank A to rank C based on the following criteria. Grades with excellent tooth rigidity (deformation resistance) are ranked in order of rank C, rank B, and rank A, and the level of rank A or rank B is evaluated to be the one in which the effect of the reinforcing layer appears remarkably in practice.

Rank A: K value (relative value) is 1.7 or more
Rank B: K value (relative value) is 1.5 or more and less than 1.7
Rank C: K value (relative value) is less than 1.5

Verification Results (1) In the Case of Using the Unidirectional Fiber Sheet 1 (230 GPa)

Examples A to C and Comparative Examples A to C

The tooth rigidity (K value) in the case where the unidirectional fiber sheet 1 (230 GPa) made of carbon fiber filaments each having a high unidirectional fiber elastic modulus was arranged at a thickness of 0.10 mm (index Z=230×0.10=23) and the position H2 (and the ratio of H2/H1) in the belt thickness direction was varied was compared to that of the toothed belt (index K value of tooth rigidity: 1.00) of Comparative Example A including no reinforcing layer (unidirectional fiber sheet).

In Comparative Example B (9%) and Comparative Example C (19%) in which the ratio of H2/H1 was small (that is, arranged on the side close to the core wire), the tooth rigidity (K value) was evaluated as rank C. In Example A (38%), Example B (53%), and Example C (100%), the evaluation was improved to rank A.

Examples D to F

In Example D (thickness: 0.05 mm, index Z=12) and Example E (thickness: 0.20 mm, index Z=46) in which the thickness was changed with respect to the reinforcing layer (H2/H1×100=53%, thickness: 0.10 mm, index Z=23) of Example B, the tooth rigidity (K value) was evaluated as rank A.

In Example F corresponding to an example in which the thickness of the reinforcing layer was further reduced with respect to Example C and the ratio of H2/H1 was increased with respect to Example D, the tooth rigidity (K value) was evaluated as rank A.

(2) In the Case of Using the Unidirectional Fiber Sheet 2 (290 GPa)

Example G

In the arrangement (H2/H1×100=53%, thickness: 0.10 mm) of the reinforcing layer of Example B, in the reinforcing layer (index Z=290×0.10=29) of Example G using the unidirectional fiber sheet 2 (290 GPa) made of filaments each having a higher unidirectional fiber elastic modulus, the tooth rigidity (K value) was also evaluated as rank A.

(3) In the Case of Using the Unidirectional Fiber Sheet 3 (112 GPa)

Examples H to K

In the arrangement (H2/H1×100=53%, thickness: 0.10 mm) of the reinforcing layer of Example B, in the reinforcing layer (index Z=112×0.10=11) of Example H using the unidirectional fiber sheet 3 (112 GPa) made of the aramid fiber filaments each having a small unidirectional fiber elastic modulus, the tooth rigidity (K value) was evaluated as rank A although the tooth rigidity was smaller than that of Example B.

In Example I in which the arrangement of the reinforcing layer was changed so that H2/H1×100 was 100% with respect to the reinforcing layer of Example H, the tooth rigidity (K value) was evaluated as rank A.

Furthermore, in Example K (thickness: 0.20 mm, index Z=22) in which the thickness was increased with respect to the reinforcing layer (H2/H1×100=53%, thickness; 0.10 mm, index Z=11) of Example H, the tooth rigidity (K value) was also evaluated as rank A, but in Example J (thickness: 0.05 mm, index Z=5.6) in which the thickness was reduced, the tooth rigidity (K value) was slightly insufficient and evaluated as rank B.

(4) In the Case of Using the Unidirectional Fiber Sheet 4 (54.7 GPa)

Examples L to M and Comparative Examples D to E

In the arrangement (H2/H1×100=53%, thickness: 0.10 mm) of the reinforcing layer of Example H, in the reinforcing layer (index Z=54.7×0.10=5.5) of Example L using the unidirectional fiber sheet 4 (54.7 GPa) made of the aramid fiber filaments each having a smaller unidirectional fiber elastic modulus, the tooth rigidity (K value) was smaller than that of Example H and evaluated as rank B.

In Example M (thickness: 0.20 mm, index Z=11) in which the thickness was increased with respect to the reinforcing layer of Example L, the tooth rigidity (K value) was evaluated as rank A.

On the other hand, in Comparative Example E (thickness: 0.05 mm, index Z=2.7) in which the thickness was reduced with respect to the reinforcing layer of Example L, the tooth rigidity (K value) was insufficient and evaluated as rank C.

Further, in Comparative Example D in which the arrangement of the reinforcing layer was changed so that H2/H1× 100 was 100% with respect to Comparative Example E, the tooth rigidity (K value) was further insufficient and evaluated as rank C.

(5) In the Case of Using Blinds-Like Sheet (Commonly Known as Blinds-Like Cords)

In the arrangement (H2/H1×100=53%) of the reinforcing layer of Example B, the tooth rigidity (K value) of toothed belts, which were produced using the blinds-like sheet 1 (aramid fibers) and the blinds-like sheet 2 (PET fibers) which are generally called blinds-like cords and are widely used, as Comparative Example F and Comparative Example G was comparatively verified.

The thickness of the blinds-like sheet (thickness of the blinds-like cords) in Comparative Example F was 0.7 mm, and the thickness of the blinds-like sheet (thickness of the blinds-like cords) in Comparative Example G was 0.6 mm. In each of the examples, the blinds-like sheet was arranged such that a twisted cord constituting the blinds-like sheet was oriented in the belt longitudinal direction.

Although the thickness of the blinds-like sheet was larger than that of the unidirectional fiber sheet used in the examples, the tooth rigidity (K value) was insufficient and evaluated as rank C.

From the above results, it was confirmed that the tooth rigidity (K value) is improved more than the tooth rigidity (K value) in the case where the reinforcing layer is not provided, by the arrangement of the reinforcing layer made of the unidirectional fiber sheet.

Using a unidirectional fiber sheet made of fiber filaments each having a high tensile modulus, a preferable range of a high reinforcing effect on tooth rigidity (K value) was found by adjusting the following parameters.

A region in which the reinforcing layer is arranged (region in which the maximum height H2 from the bottom portion of the tooth portion to the reinforcing layer is 30% to 100% of the height H1 from the bottom portion of the tooth portion to the tooth tip)

A combination of the thickness of the reinforcing layer (unidirectional fiber sheet) and the tensile modulus of the fiber filament Rank B (K value is 1.5 or more and less than 1.7) when the index Z is 5 or more Rank A (K value is 1.7 or more) when the index Z is 10 or more (60 or less).

The present application is based on Japanese Patent Application No. 2021-009529 filed on Jan. 25, 2021 and Japanese Patent Application No. 2022-004259 filed on Jan. 14, 2022, and the content thereof is incorporated herein by reference.

REFERENCE SIGNS LIST

1: toothed belt
2: back portion
21: back rubber layer
3: tooth portion
31: bottom portion
32: tooth tip
33: first rubber layer
34: second rubber layer
4: core wire
5: reinforcing layer
50: unidirectional fiber sheet
51: reinforcing fiber filament
52: thermosetting resin
6: tooth fabric
H1: tooth height
H2: position of reinforcing layer

The invention claimed is:
1. A toothed belt comprising:
tooth portions arranged at predetermined intervals in a belt circumferential direction; and
a reinforcing layer buried along a contour of the tooth portions,
wherein,
the reinforcing layer is buried in each of the tooth portions such that a maximum height from a bottom portion of the tooth portion to the reinforcing layer is in a range of 30% to 63% of a height from the bottom portion of the tooth portion to a tooth tip of the tooth portion,
the reinforcing layer comprises a plurality of reinforcing fiber filaments arranged in the belt circumferential direction, and comprises no fibers intersecting the belt circumferential direction, the reinforcing layer has a structure in which the reinforcing fiber filaments are arranged in the belt circumferential direction and bonded to form a sheet shape in an untwisted state, the reinforcing layer has a thickness of 0.05 mm to 0.2 mm, and a tensile modulus (GPa) of each of the reinforcing fiber filaments satisfies a condition of:

5≤[thickness (mm) of the reinforcing layer]×[tensile modulus (GPa) of the reinforcing fiber filament]≤60, and a value of the tensile modulus is 50 GPa to 300 GPa.

2. The toothed belt according to claim 1, wherein each of the reinforcing fiber filaments has a diameter of 0.1 μm to 50 μm.

3. The toothed belt according to claim 1, wherein the value of the tensile modulus of each of the reinforcing fiber filaments is 50 GPa to 230 GPa.

4. The toothed belt according to claim 1, wherein the tensile modulus (GPa) of each of the reinforcing fiber filaments satisfies a condition of:

23≤[thickness (mm) of the reinforcing layer]×[tensile modulus (GPa) of the reinforcing fiber filament]≤60.

5. The toothed belt according to claim 1, wherein the reinforcing layer is buried in each of the tooth portions such that the maximum height from the bottom portion of the tooth portion to the reinforcing layer is in a range of 38% to 53% of the height from the bottom portion of the tooth portion to the tooth tip of the tooth portion.

\* \* \* \* \*